United States Patent
Ido

(10) Patent No.: US 12,399,664 B2
(45) Date of Patent: Aug. 26, 2025

(54) IMAGE PROCESSING APPARATUS CAPABLE OF DISPLAYING A SETTING HISTORY FOR WHICH AUTHENTICATION INFORMATION IS REQUIRED TO EXECUTE A JOB AND CONTROL METHOD THEROF

(71) Applicant: SHARP KABUSHIKI KAISHA, Sakai (JP)

(72) Inventor: Kazuhiko Ido, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/515,884

(22) Filed: Nov. 21, 2023

(65) Prior Publication Data

US 2024/0094965 A1  Mar. 21, 2024

Related U.S. Application Data

(63) Continuation of application No. 17/950,525, filed on Sep. 22, 2022, now Pat. No. 11,868,669.

(30) Foreign Application Priority Data

Sep. 27, 2021  (JP) .................. 2021-157131

(51) Int. Cl.
    G06F 3/12    (2006.01)
(52) U.S. Cl.
    CPC .......... G06F 3/1273 (2013.01); G06F 3/1222 (2013.01); G06F 3/1284 (2013.01)

(58) Field of Classification Search
    CPC .... G06F 3/1273; G06F 3/1222; G06F 3/1284; G06F 3/1285; H04N 1/00474; H04N 1/0048; H04N 1/00832; H04N 1/4413
    See application file for complete search history.

(56) References Cited

U.S. PATENT DOCUMENTS

2007/0067680 A1* 3/2007 Harada ................. G06F 21/608
                                                    714/45
2007/0106905 A1* 5/2007 Ito ......................... G06F 21/31
                                                    713/184

(Continued)

FOREIGN PATENT DOCUMENTS

JP    2005212137 A    8/2005
JP    2006-350775 A   12/2006

OTHER PUBLICATIONS

Non-Final Rejection dated May 22, 2023 for U.S. Appl. No. 17/950,525.

(Continued)

Primary Examiner — Iriana Cruz
(74) Attorney, Agent, or Firm — ScienBiziP, P.C.

(57) ABSTRACT

An image processing apparatus includes: a setting history storage that stores a setting history being a history of a setting value when a job is executed; a list displayer that displays a list of the setting history; a setting screen displayer that displays, in a case where the setting history is selected, a setting screen on which the setting value included in the selected setting history is input; and a job executer that executes a job, based on the setting value input on the setting screen. The list displayer displays a list including the setting history for which authentication information is required, in a case where a job based on the setting value is executed.

9 Claims, 28 Drawing Sheets

(56) References Cited

U.S. PATENT DOCUMENTS

| | | | | |
|---|---|---|---|---|
| 2008/0282065 | A1* | 11/2008 | Imamichi | G06F 3/1285 |
| | | | | 712/E9.016 |
| 2009/0195822 | A1* | 8/2009 | Hiraike | G06F 3/1222 |
| | | | | 358/1.15 |
| 2013/0155452 | A1* | 6/2013 | Koizumi | G06F 3/1237 |
| | | | | 358/1.15 |
| 2013/0335778 | A1 | 12/2013 | Sugiyama | |
| 2014/0104638 | A1* | 4/2014 | Kato | H04N 1/4426 |
| | | | | 358/1.14 |
| 2014/0211240 | A1* | 7/2014 | Maki | G06K 15/4095 |
| | | | | 358/1.14 |
| 2016/0219158 | A1* | 7/2016 | Morita | H04N 1/00244 |
| 2016/0286074 | A1* | 9/2016 | Tsujimoto | H04N 1/04 |
| 2018/0007235 | A1 | 1/2018 | Kakutani | |
| 2018/0084140 | A1 | 3/2018 | Yagiura | |
| 2018/0300463 | A1 | 10/2018 | Takeo | |
| 2018/0316802 | A1* | 11/2018 | Takamiya | G06F 3/1205 |
| 2019/0109958 | A1 | 4/2019 | Nakajima | |
| 2019/0306349 | A1* | 10/2019 | Shino | H04N 1/00482 |
| 2020/0314287 | A1* | 10/2020 | Kawamura | H04N 1/444 |
| 2022/0019393 | A1 | 1/2022 | Hamada | |

OTHER PUBLICATIONS

Notice of Allowance and Fee(s) Due issued on Aug. 23, 2023 for U.S. Appl. No. 17/950,525.

* cited by examiner

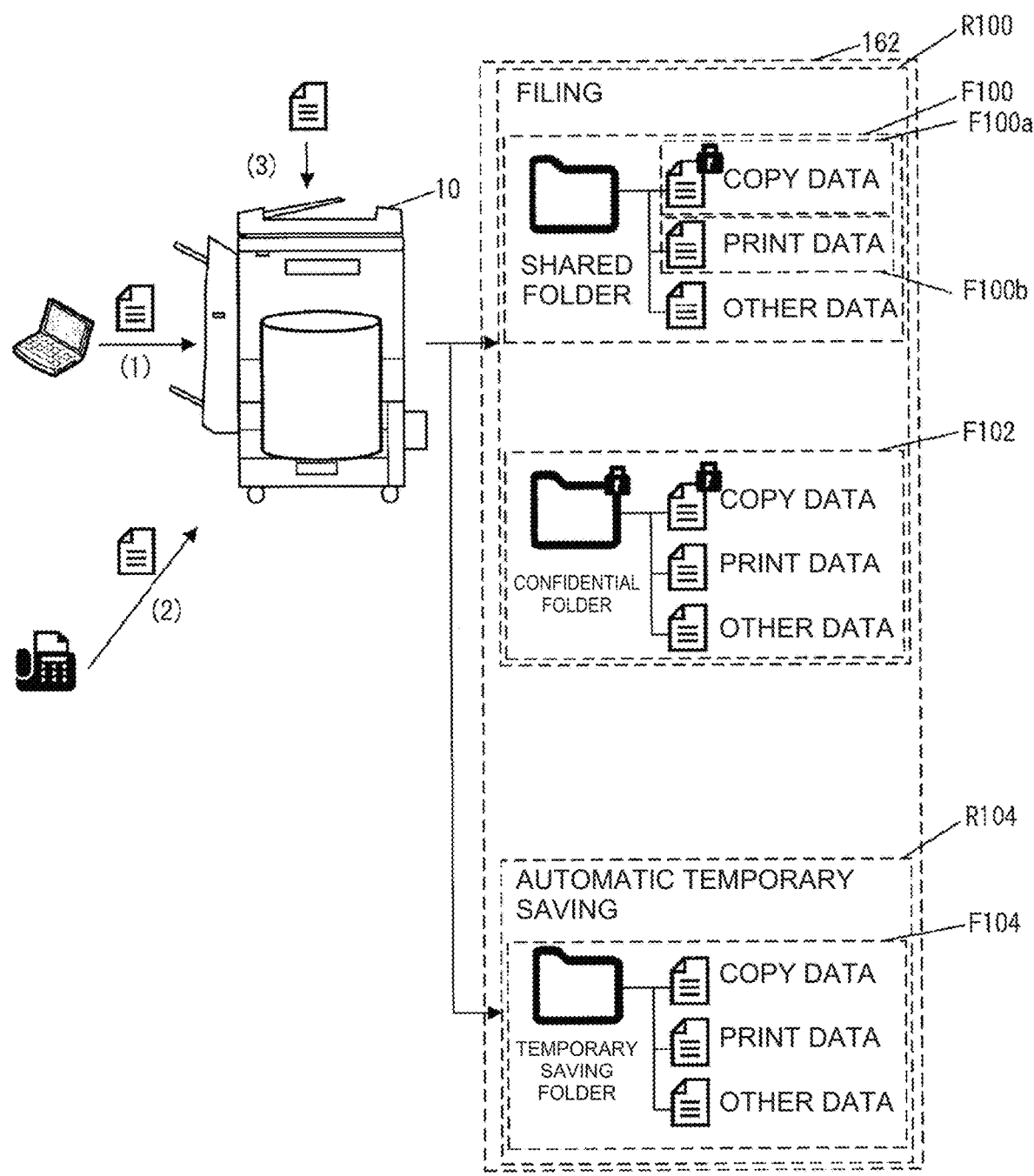

FIG. 4

| JOB ID | JOB TYPE | SETTING VALUE | EXECUTION DATE AND TIME |
|---|---|---|---|
| 0025 | PRINT | OUTPUT TRAY: TRAY 1<br>SINGLE-SIDED OR DOUBLE-SIDED:<br>SINGLE SIDED→SINGLE SIDED<br>STAPLING: STAPLELESS STAPLING<br><br>STORAGE DESTINATION: CONFIDENTIAL FOLDER<br>FILE NAME :Copy_20210401_162050 | 2021/04/01<br>16:20:50 |
| 0024 | SCAN AND SAVE | STORAGE DESTINATION: SHARED FOLDER<br>FILE NAME :Scan_20210401_160011 | 2021/04/01<br>16:00:11 |
| ⋮ | ⋮ | ⋮ | ⋮ |

| JOB ID | JOB TYPE | EXECUTION DATE AND TIME | STATUS |
|---|---|---|---|
| 0025 | PRINT | 2021/04/01<br>16:20:50 | FINISHED |
| 0024 | SCAN AND SAVE | 2021/04/01<br>16:00:11 | FINISHED |
| ⋮ | ⋮ | ⋮ | ⋮ |

OUTPUT JOB

FIG. 19

| USER ID | USER NAME | PASSWORD | MY FOLDER |
|---------|-----------|----------|-----------|
| UserA | USER A | abc123 | REGISTERED FOLDER 1 |
| UserB | USER B | def456 | - |
| UserC | USER C | ghi789 | REGISTERED FOLDER 2 |
| ⋮ | ⋮ | ⋮ | ⋮ |

FIG. 20

| USER ID | REGISTERED NAME | PATH | FOLDER TYPE | FOLDER PASSWORD |
|---------|-----------------|------|-------------|-----------------|
| UserA | REGISTERED FOLDER 1 | /usr/UserA/fld1 | CONFIDENTIAL FOLDER | aaa12345 |
| UserA | REGISTERED FOLDER 2 | /usr/UserA/fld2 | SHARED FOLDER | - |
| UserB | REGISTERED FOLDER 1 | /usr/UserB/fld1 | CONFIDENTIAL FOLDER | xyz789 |
| ⋮ | ⋮ | ⋮ | ⋮ | ⋮ |
| - | STANDARD FOLDER | /etc/shared | SHARED FOLDER | - |
| - | TEMPORARY SAVING FOLDER | /etc/tmp | SHARED FOLDER | - |
| ⋮ | ⋮ | ⋮ | ⋮ | ⋮ |

FIG. 21

| JOB ID | JOB TYPE | USER ID | SETTING VALUE | EXECUTION DATE AND TIME |
|---|---|---|---|---|
| 0025 | PRINT | UserA | OUTPUT TRAY: TRAY 1<br>SINGLE-SIDED OR DOUBLE-SIDED: SINGLE SIDED→SINGLE SIDED<br>STAPLING: STAPLELESS STAPLING<br>STORAGE DESTINATION: REGISTERED FOLDER 1<br>FILE NAME : Copy_20210401_162050 | 2021/04/01<br>16:20:50 | D300
| 0024 | PRINT | UserB | OUTPUT TRAY: TRAY 1<br>SINGLE-SIDED OR DOUBLE-SIDED: SINGLE SIDED→SINGLE SIDED<br>STAPLING: STAPLELESS STAPLING<br>STORAGE DESTINATION: STANDARD FOLDER<br>FILE NAME : Copy_20210401_160011 | 2021/04/01<br>16:00:11 |
| ⋮ | ⋮ | ⋮ | ⋮ | ⋮ |

IMAGE PROCESSING APPARATUS
CAPABLE OF DISPLAYING A SETTING
HISTORY FOR WHICH AUTHENTICATION
INFORMATION IS REQUIRED TO EXECUTE
A JOB AND CONTROL METHOD THEROF

CROSS REFERENCE OF RELATED
APPLICATION

The present application is a continuation application of U.S. patent application Ser. No. 17/050,525, filed on Sep. 22, 2022, which claims priority from Japanese Patent Application No. 2021-157131 filed on Sep. 27, 2021, the content of which is hereby incorporated by reference into this application.

BACKGROUND OF THE INVENTION

Field of the Invention

The present disclosure relates to an image processing apparatus and the like.

Description of the Background Art

Some image processing apparatuses such as multifunction machines have a retention function of storing data used for output in the image processing apparatus, and outputting the data, based on a user operation. Furthermore, some image processing apparatuses have a function of, by requiring authentication information such as a password when referring to stored data, protecting the data, restricting output of the data, and securing security.

In addition, a technique related to a confidential printing function has also been proposed. For example, there is known an image processing apparatus that allows, even when an authenticated user stores data in a user area allocated to another user different from the authenticated user, to perform processing for the data, as far as the data are data stored by the authenticated user himself/herself.

Some image processing apparatuses store a setting history including a setting value pertaining to execution of a job in a reusable manner. Further, some setting histories include information that may cause a security problem when reused as it is, such as a setting value indicating a storage destination of protected data. On the other hand, usability may be impaired, when display and the like of a content of a setting history including a setting value and the like indicating a storage destination of protected data are restricted for the purpose of securing security. Therefore, there is a task that enables appropriate use of a setting history, while securing security. However, the above-described task has not been considered in a conventional art.

In view of the above-described task, an object of the present disclosure is to provide an image processing apparatus and the like that enable appropriate use of a job setting history for which authentication information is required.

SUMMARY OF THE INVENTION

To achieve the above-described task, an image processing apparatus according to the present disclosure includes: a setting history storage that stores a setting history being a history of a setting value when a job is executed; a list displayer that displays a list of the setting history; a setting screen displayer that displays, in a case where the setting history is selected, a setting screen on which the setting value included in the selected setting history is input; and a job executer that executes a job, based on the setting value input on the setting screen. The list displayer displays a list including the setting history for which authentication information is required, in a case where a job based on the setting value is executed.

A control method according to the present disclosure is a control method for an image processing apparatus. The method includes: storing a setting history being a history of a setting value when a job is executed; displaying a list of the setting history; displaying, in a case where the setting history is selected, a setting screen on which the setting value included in the selected setting history is input; and executing a job, based on the setting value input on the setting screen. The list displaying includes displaying a list including the setting history for which authentication information is required, in a case where a job based on the setting value is executed.

According to the present disclosure, it is possible to provide an image processing apparatus that enables appropriate use of a job setting history for which authentication information is required.

BRIEF DESCRIPTION OF THE DRAWINGS

FIG. 3 is a conceptual diagram of a job data storage area according to the first embodiment.

FIG. 4 is a table illustrating a data structure of setting history information according to the first embodiment.

FIG. 5 is a table illustrating a data structure of job history information according to the first embodiment.

FIG. 19 is a table illustrating a data structure of user information according to the third embodiment.

FIG. 20 is a table illustrating a data structure of folder information according to the third embodiment.

FIG. 21 is a table illustrating a data structure of setting history information according to the third embodiment.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the invention described in the claims is not limited to the following description.

1. First Embodiment 1.1 Functional Configuration

Figure 1:
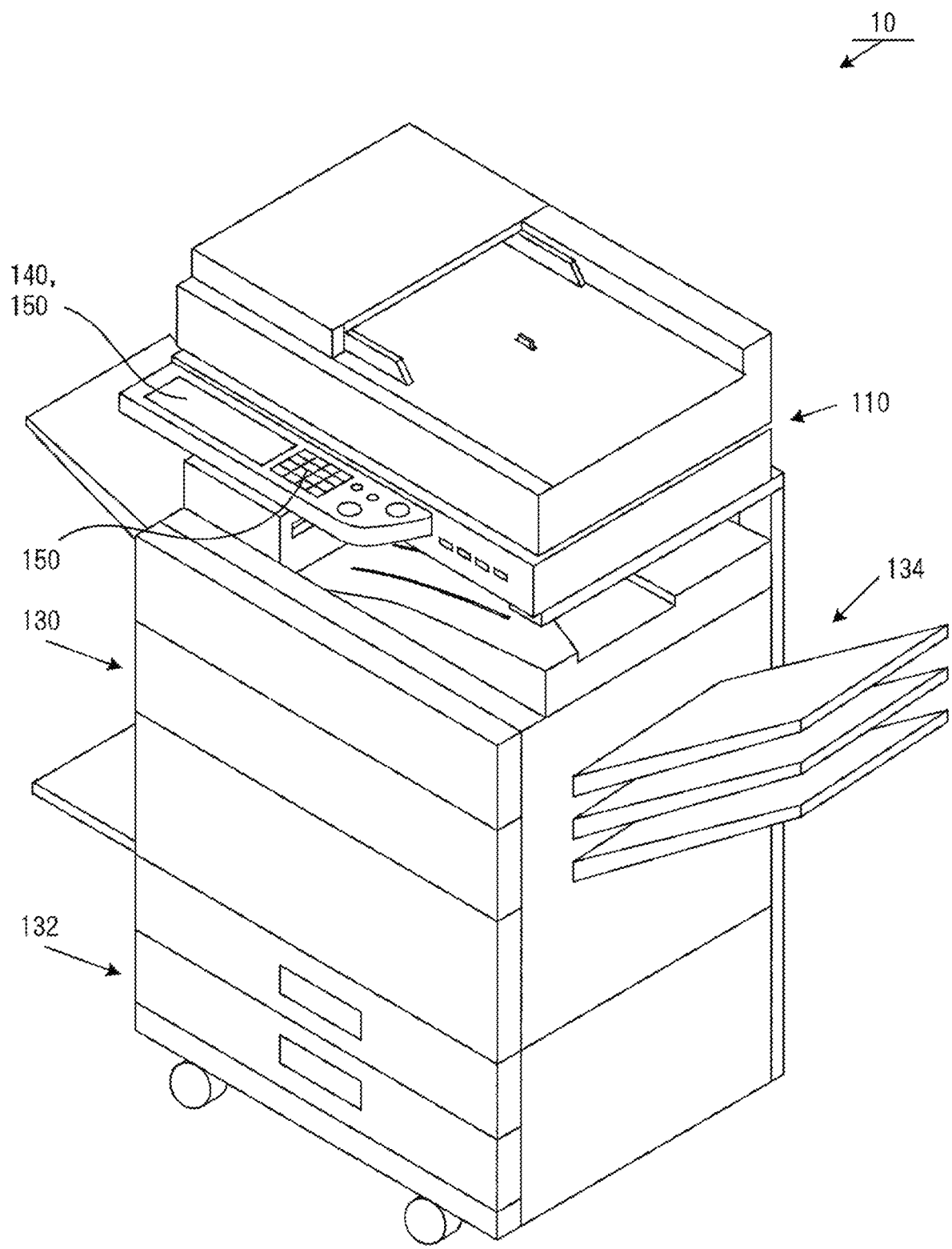
FIG. 1 is an external perspective view of an image processing apparatus according to a first embodiment.
Figure 2:
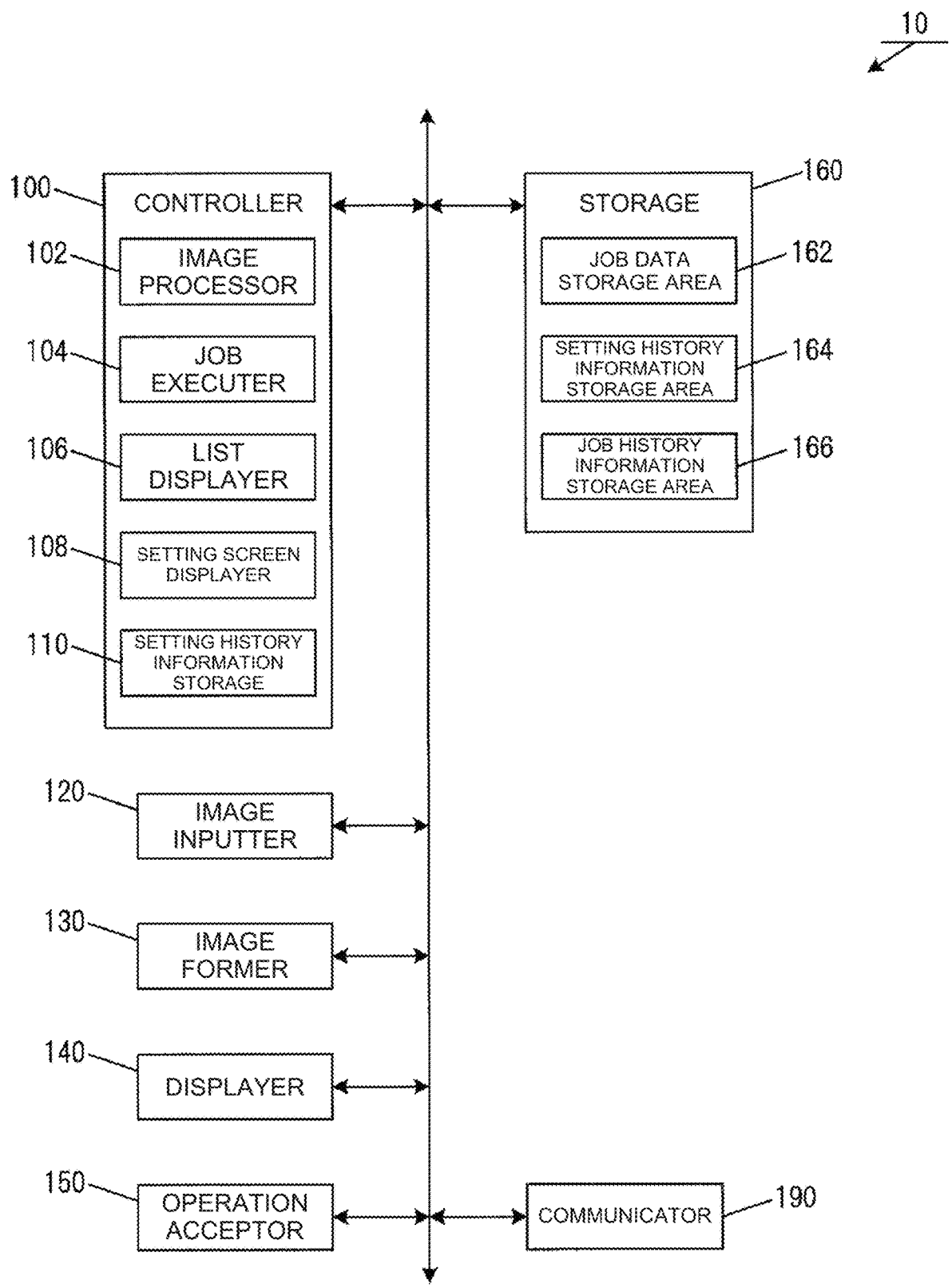
FIG. 2 is a diagram illustrating a functional configuration of the image processing apparatus according to the first embodiment.

A first embodiment is described with reference to the drawings. FIG. 1 is an external perspective view of an image processing apparatus 10 according to the first embodiment, and FIG. 2 is a block diagram illustrating a functional configuration of the image processing apparatus 10.

The image processing apparatus 10 is an apparatus having an image transmission function and the like such as a copy function, a print function, a scanner function, and a facsimile function, and is an apparatus generally called a digital multifunction machine (MFP; Multi-Function Peripheral/Printer). The image processing apparatus 10 may be an image forming apparatus including a means for forming an image on recording paper by using a means such as an electrophotographic method.

The image processing apparatus 10 includes a controller 100, an image inputter 120, an image former 130, a displayer 140, an operation acceptor 150, a storage 160, and a communicator 190.

The controller 100 is a functional unit for controlling the entirety of the image processing apparatus 10. The controller 100 achieves various functions by reading and executing various programs stored in the storage 160. For example, the controller 100 is composed of one or more arithmetic devices (central processing units (CPUs)) and the like. The controller 100 may also be configured as a system on a chip (SoC) having a plurality of functions among those described below.

The controller 100 functions as an image processor 102, a job executer 104, a list displayer 106, a setting screen displayer 108, and a setting history information storage 110 by executing a program stored in the storage 160.

The image processor 102 performs various pieces of processing concerning an image. For example, the image processor 102 performs sharpening processing and gradation conversion processing for an image input by the image inputter 120.

The job executer 104 executes, in the unit of a job, processing accompanying execution of each function such as a copy function, a print function, a scanner function, and an image transmission function provided in the image processing apparatus 10. In particular, the job executer 104 executes a job, based on a setting value of a setting item provided for each function to be executed. Setting items are, for example, the number of copies to be output, a color mode at a time of output, a magnification at a time of output, a destination of scanned data, and the like. A setting value is input via a setting screen to be displayed by the setting screen displayer 108 to be described later.

The list displayer 106 reads setting history information stored in a setting history information storage area 164, which is described later, and displays, on the displayer 140, a list of information included in the setting history information.

The setting screen displayer 108 displays a setting screen associated with each function provided in the image processing apparatus 10. A setting screen is a screen that displays a setting value for each setting item associated with a function to be performed, and accepts an operation of changing a setting value. Furthermore, the setting screen displayer 108 according to the present embodiment reads a setting value stored in setting history information to be described later, and displays a setting screen that reflects the read setting value.

The setting history information storage 110 stores setting history information including a setting value at a time of job execution when a job is executed. In other words, setting history information is information on a history of a setting value at a time of job execution.

The image inputter 120 inputs data to the image processing apparatus 10. For example, the image inputter 120 is configured of a scan device or the like that enables to generate image data by reading an image. The scan device converts an image into an electrical signal by an image sensor such as, for example, a charge coupled device (CCD) or a contact image sensor (CIS), and generates digital data by quantizing and encoding the electrical signal.

The image former 130 forms (prints) an image on a recording medium such as recording paper. The image former 130 is composed of, for example, a laser printer or the like using an electrophotographic method. The image former 130, for example, feeds recording paper from a paper feeding tray 132 in FIG. 1, forms an image on a surface of the recording paper, and discharges the recording paper from a paper discharge tray 134.

The displayer 140 displays various pieces of information. The displayer 140 is configured of a display device such as, for example, a liquid crystal display (LCD), an organic electro-luminescence (EL) display, or a micro LED display.

The operation acceptor 150 accepts an operation of a user using the image processing apparatus 10. The operation acceptor 150 is configured of an input device such as a touch sensor. A method of detecting an input by a touch sensor may be a general detection method, such as, for example, a resistive film method, an infrared method, an electromagnetic induction method, or a capacitance method. Note that, the image processing apparatus 10 may include a touch panel in which the displayer 140 and the operation acceptor 150 are integrally formed.

The storage 160 stores various programs necessary for an operation of the image processing apparatus 10, and various pieces of data. The storage 160 is configured of a storage device such as, for example, a solid state drive (SSD) being a semiconductor memory, or a hard disk drive (HDD).

The storage 160 secures, as storage areas, a job data storage area 162, a setting history information storage area 164, and a job history information storage area 166.

The job data storage area 162 stores job data. Job data are data to be input to the image processing apparatus 10 for use in executing a job. For example, job data are data (image data for image formation) to be input for image formation via the image former 130, or data to be input via the image inputter 120 at a time of copying or scanning. Job data are, for example, image data or data in a portable document format (PDF), data (print data) including a command interpretable by the controller 100, and the like.

Referring to FIG. 3, an overview of the job data storage area 162 is described. Job data to be stored in the job data storage area 162 are data to be input by the following methods. Note that, the following reference signs correspond to reference signs in FIG. 3.

(1) Data to be Input from Terminal Device Such as Personal Computer (PC)

Data to be input from a terminal device are data to be printed or transmitted by the image processing apparatus 10. Job data to be input from a terminal device are data such as, for example, copy data, print data, PC-FAX transmission data, scan transmission data, fax transmission data, and Internet fax transmission data.

(2) Data to be Transmitted from Another Facsimile Machine

Data to be transmitted from another facsimile machine are data received via a facsimile line, such as, for example, fax reception data and Internet fax reception data.

(3) Data Input by Image Inputter 120

Data input by the image inputter 120 are, for example, image data of a document read by a scan device constituting the image inputter 120.

The job data described above are subjected to filing or automatically and temporarily saved in the image processing apparatus 10. Filing means storing in a storage area (e.g., R100 in FIG. 3) for filing. On the other hand, automatic temporary saving means temporarily storing in a storage area (e.g., R104 in FIG. 3) for automatic temporary saving. Note that, automatically and temporarily saved job data may be automatically deleted by the image processing apparatus 10 at a predetermined time, such as when a job is executed, or when a predetermined storage period elapses.

Determination on filing or automatic temporary saving may be selected by a user, or may be automatically selected based on settings of the image processing apparatus 10. Note that, only filing is performed for job data based on data to be transmitted from another facsimile machine.

Job data are stored, for example, as a file of a predetermined format. A file to be stored is, for example, a file in a PDF format, or an image file in a generally used format. Note that, in the present embodiment, job data to be stored in the job data storage area 162 are assumed to be a file. In the present embodiment, the following two types of files are assumed to be present as a file to be stored in the job data storage area 162.

(1) Confidentiality Attribute File

A confidentiality attribute file is a file of job data (confidential data) for which authentication information such as a password is required when being read. Authentication information may be included in a confidentiality attribute file itself as a file attribute or a file content, or may be managed in association with a confidentiality attribute file.

(2) Shared File

A shared file is a file of job data (shared data) for which authentication information is not required when being read.

A confidentiality attribute file and a shared file may be distinguishable in terms of an attribute of a file. For example, a file to be stored as job data may include a confidential setting attribute indicating that authentication information is required. In this case, a confidentiality attribute file may have, as an attribute value "confidential" or "Yes" of an attribute for confidential setting. In addition, a shared file may have an attribute value "shared" or "No" of an attribute for confidential setting, or may not store an attribute value. Thus, it is possible to distinguish whether a file is a confidentiality attribute file from an attribute value for confidential setting.

The job data storage area 162 may have a plurality of areas for storing job data. An area for storing job data is, for example, a folder. The job data storage area 162 may have, as a folder (filing folder) for filing, for example, a shared folder (e.g., a "shared folder" F100 in FIG. 3), and a confidential folder (e.g., a "confidential folder" F102 in FIG. 3) in a storage area for filing.

A shared folder and a confidential folder are folders for storing job data in which a file name, a user name, and the like are set, and can store a confidentiality attribute file and a shared file. For example, the "shared folder" F100 includes a confidentiality attribute file (e.g., "copy data" F100a in FIG. 3), and a shared file (e.g., "print data" F100b in FIG. 3). On the other hand, a shared folder and a confidential folder are different as to whether authentication information is required when referring to a folder. A shared folder does not require authentication information when being referred to (accessed). On the other hand, a confidential folder is a folder for which authentication information is set, and requires authentication information when being referred to (accessed). Authentication information for a confidential folder is, for example, a personal identification number (PIN) or a folder password. Authentication information may be included in a confidentiality attribute file itself, as an attribute of a folder, or may be managed in association with a confidential folder.

In addition, the job data storage area 162 includes, in a storage area for automatic temporary saving, a temporary saving folder (a "temporary saving folder" F104 in FIG. 3). Job data are temporarily saved in a temporary saving folder. Note that, a temporary saving folder is a shared folder for which authentication information is not required when being referred to, and only a shared file can be stored.

As described above, in the present embodiment, the following files require authentication information when being read among files (job data) stored in the job data storage area 162.

(1) Confidentiality Attribute File Stored in Confidential Folder

When referring to a confidentiality attribute file stored in a confidential folder, authentication information set for the confidential folder, and authentication information set for the confidentiality attribute file are required.

(2) Shared File Stored in Confidential Folder

When referring to a shared file stored in a confidential folder, authentication information set for the confidential folder is required.

(3) Confidentiality Attribute File Stored in Shared Folder

When referring to a confidentiality attribute file stored in a shared folder, authentication information set for the confidentiality attribute file is required.

Note that, in the present embodiment, a file for which authentication information is required when being read is described as a protected file. On the other hand, a shared file stored in a shared folder does not require authentication information when being read.

The setting history information storage area 164 stores setting history information. As illustrated in FIG. 4, for example, setting history information includes a job ID (e.g., "0025") for identifying a job, a type (e.g., "print") of an executed job, and setting values (e.g., "output tray: tray 1, single-sided or double-sided: single-sided→single-sided, stapling: stapleless stapling, storage destination: confidential folder, file name: Copy_20210401_162050") at a time of executing a stapling job, and an execution date and time (e.g., "2021/04/01 16:20:50") of the job.

A job type included in setting history information is information indicating a function (e.g., copy, print, scan, image transmission) of the image processing apparatus 10 associated with a job executed by the user. A code for determining a name of a function or a function is stored as a job type.

Further, setting values include information related to a storage destination and a file name (data name) of a file (job data) output or stored when a job is executed. For example, setting values include information on a folder (e.g., a "confidential folder") being a storage destination of a file, and a file name (e.g., "Copy_20210401_162050") of a file stored in the folder. Setting history information indicated by D100 in FIG. 4 indicates setting history information on a print job in which job data having a file name "Copy_20210401_162050" stored in a confidential folder are output.

The job history information storage area 166 stores information (job history information) on a history of an executed job. As illustrated in FIG. 5, for example, job history information includes a job ID (e.g., "0025") for identifying a job, a type (e.g., "print") of an executed job, an execution date and time (e.g., "2021/04/01 16:20:50") of a job, and a status (e.g., "finished") of processing of the job. Unlike setting history information, job history information is information indicating an execution history of a job. Therefore, information on a setting value when a job is executed is not included. Job history information is generated and stored, for example, immediately after a job is completed, or after setting history information is generated.

The communicator 190 communicates with an external device via a local area network (LAN) or a wide area network (WAN). The communicator 190 is configured of, for example, a communication device or a communication module such as a network interface card (NIC) used in a wired/wireless LAN.

Note that, the communicator 190 may communicate with another device via a telephone line. In this case, the communicator 190 is configured of an interface (terminal) into which a cable to be connected to a telephone line can be inserted, and performs image transmission and reception to and from another device by performing facsimile communication with use of well-known standards such as G3/G4 standards, and a protocol.

1.2 Flow of Processing

Figure 6:
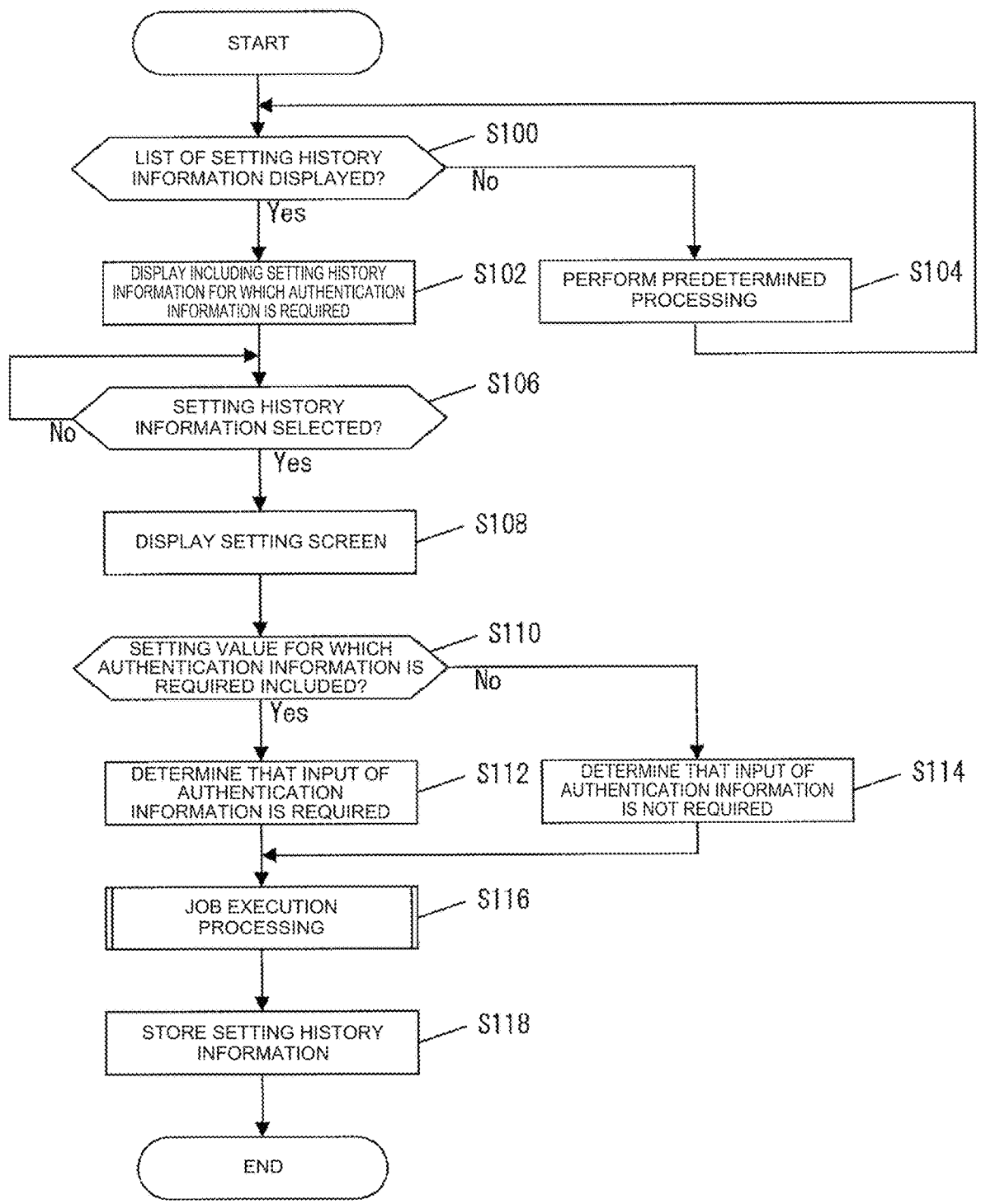
FIG. 6 is a flowchart illustrating a flow of processing of the image processing apparatus according to the first embodiment.
Figure 7:
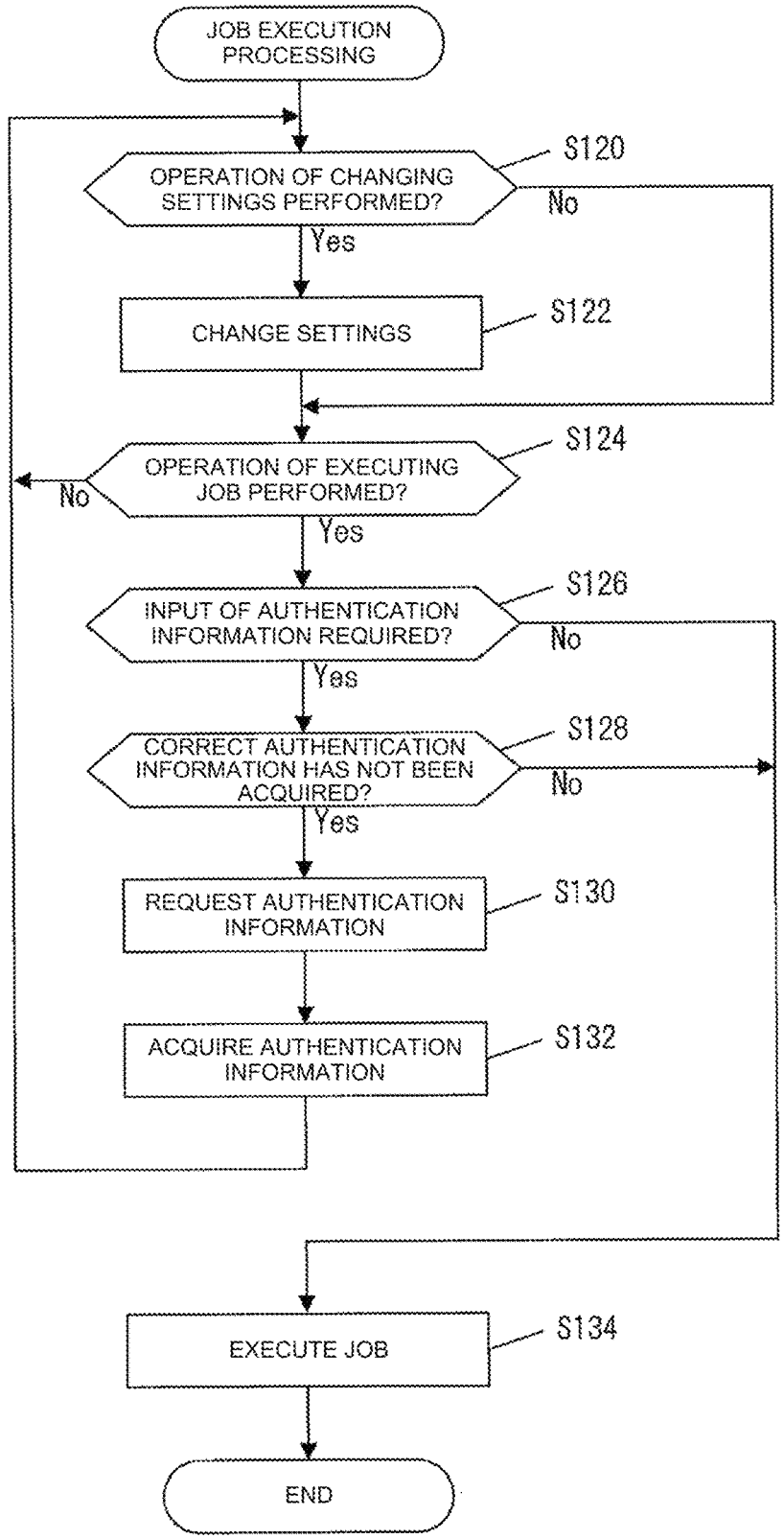
FIG. 7 is a flowchart illustrating a flow of job execution processing according to the first embodiment.

Next, a flow of processing to be performed by the image processing apparatus 10 according to the present embodiment is described with reference to FIGS. 6 and 7. Processing illustrated in FIGS. 6 and 7 is performed by causing the controller 100 of the image processing apparatus 10 to read a program stored in the storage 160.

Note that, in the following description, it is assumed that predetermined setting history information and job data associated with the setting history information are stored in the storage 160 of the image processing apparatus 10. Also, a case is described in which the image processing apparatus 10 according to the present embodiment does not perform user authentication of a user using the image processing apparatus 10 (a case in which user authentication is invalid, and a user is in an unauthenticated state).

1.2.1 Main Processing

First, primary processing (main processing) to be performed by the image processing apparatus 10 is described with reference to FIG. 6. First, the controller 100 determines whether an operation of displaying a list of setting history information has been performed by the user (step S100).

In a case where an operation of displaying a list of setting history information is performed, the controller 100 (list displayer 106) causes the displayer 140 to display a list of setting history information including setting history information for which authentication information is required (step S100; Yes→step S102). Setting history information for which authentication information is required is setting history information for which input of authentication information is required, in a case where the setting history information is invoked, and a job of using a setting value stored in the setting history information is executed.

Setting history information for which authentication information is required is the following pieces of setting history information.

(1) Setting History Information on Job of Outputting Protected File

A job of outputting a protected file is a print job (confidential print job) of outputting an image based on a protected file (job data) by printing, or an image transmission job of outputting a protected file to an external device by transmitting the protected file. Therefore, setting values of setting history information on these jobs include a storage destination and a file name of a protected file. In a case where a job based on setting history information on a job of outputting a protected file is executed, since a protected file is read by the job executer 104, authentication information set for a confidential folder, or authentication information set for a confidentiality attribute file is required. Note that, in the following description, a job of outputting an image based on a file (job data) by printing is also described as a job of printing (outputting) a file.

(2) Setting History Information on Job of Storing File in Confidential Folder

A job of storing a file in a confidential folder is a job of storing, in a confidential folder, image data input by the image inputter 120 at a time of copying or scanning. Therefore, setting values of setting history information on these jobs include information on a confidential folder as a storage destination. In a case where a job based on setting history information on a job of storing a file in a confidential folder is executed, since the confidential folder is referred to by the job executer 104, authentication information set for the confidential folder is required.

Note that, in the embodiment, a job of outputting a protected file, and a job of storing a file in a confidential folder are also referred to as a confidential job. Regarding setting history information on a confidential job, a storage destination and a file name of a protected file to be output, and a setting value of a storage destination of a file to be stored are invoked. When such a job using a setting value is executed, authentication information is required.

Note that, setting history information on a job, which is not a confidential job, does not require authentication information. In step S102, for example, the list displayer 106 reads, from the setting history information storage area 164, a predetermined number of (e.g., five) pieces of setting history information in order of most recent execution date and time, and displays a screen (setting history information display screen) on which information including the read setting history information is set as a list item for each piece of setting history information.

Note that, when the list displayer 106 displays a list of setting history information, the list displayer 106 may display setting history information for which authentication information is required, and setting history information for which authentication information is not required in a distinguishable manner. Further, the list displayer 106 may also display setting values (a storage destination and a file name of a protected file) for which authentication information is required when a job is executed.

Note that, in a case where an operation other than the operation of displaying setting history information is performed by the user, the controller 100 performs predetermined processing according to an operation input by the user, and returns to step S100 (step S100; No→step S104→step S100).

Subsequently, the controller 100 determines whether one piece of setting history information is selected on the setting history information display screen (step S106). In a case where setting history information is not selected, the controller 100 repeats processing of step S106 (step S106; No).

On the other hand, in a case where setting history information is selected, the controller 100 (setting screen displayer 108) causes the displayer 140 to display a setting screen based on the selected setting history information (step S106; Yes→step S108). For example, the setting screen displayer 108 displays a setting screen including a setting item according to a job type included in setting history information. Also, the setting screen displayer 108 allows a setting value included in the selected setting history information to be input as a setting value of an associated setting item. In this way, the setting screen displayer 108 displays a setting screen on which a setting value included in setting history information is input (a setting screen on which setting history information is invoked, and a setting value of the setting history information is reflected). Note that, the setting screen displayer 108 may display, on a setting screen, setting values (a storage destination and a file name of a protected file) for which authentication information is required when a job is executed, or may display an identification indication indicating that authentication information is required when a job is executed.

Subsequently, the controller 100 determines whether the selected setting history information includes a setting value for which authentication information is required (step S110). A case where a setting value for which authentication information is required is included is the following cases.

(1) A case where information on a function concerning output of a file, such as "printing" and "image transmission" is included for each job type, and a storage destination and a file name of a protected file are included in setting values.

(2) A case where information on a function concerning storing a file such as "scan and save" is included for each job type, and a confidential folder is included in setting values, as a storage destination.

In a case where selected setting history information includes a setting value for which authentication information is required, the controller 100 determines that input of authentication information is required (step S110; Yes→step S112). On the other hand, in a case where selected setting history information does not include a setting value for which authentication information is required, the controller 100 determines that input of authentication information is not required (step S110; No→step S114).

Subsequently, the controller 100 (job executer 104) performs processing (job execution processing) of executing a job, based on a setting value input on the setting screen (step S116). The job execution processing is described later. Note that, the job executer 104 issues a job ID when a job is executed, or after a job is executed, and stores job history information including the job ID in the job history information storage area 166.

Subsequently, the controller 100 (setting history information storage 110) stores setting history information concerning an executed job in the setting history information storage area 164 (step S118). For example, the setting history information storage 110 generates setting history information including a job ID issued in step S114, a job type of an executed job, a setting value of an executed job, and an execution date and time of a job, and stores the setting history information in the setting history information storage area 164.

1.2.2 Job Execution Processing

Job execution processing is described with reference to FIG. 7. The job execution processing is performed by the job executer 104.

First, in a case where an operation of changing settings is performed by the user, the job executer 104 changes settings of a job (step S120; Yes→step S122). For example, the controller 100 changes settings such as the number of copies to be printed, a color mode, a paper size, and a print density in response to a user operation. At this occasion, the job executer 104 may not allow changing a storage destination of a file or a file name, in a case where a setting screen for outputting a file is displayed, or may not allow changing a storage destination of a file, in a case where a setting screen for storing a file is displayed. In other words, the job executer 104 may restrict a setting item for which a setting value can be changed. Note that, in a case where an operation of changing settings is not performed, the controller 100 skips processing of step S122 (step S120; No).

Subsequently, the job executer 104 determines whether an operation of executing a job has been performed by the user (step S124). An operation of starting a job is, for example, an operation of selecting a trigger button of each function, such as a start button. In a case where an operation of starting a job has not been performed, the job executer 104 returns to step S120 (step S124; No→step S120).

On the other hand, in a case where an operation of executing a job has been performed, the job executer 104 determines whether input of authentication information is required, based on a determination result in step S112 and step S114 in FIG. 6 (step S124; Yes→step S126). In a case where input of authentication information is not required, the job executer 104 executes a job, based on a setting value input via the setting screen (step S126; No→step S134).

On the other hand, in a case where input of authentication information is required, the job executer 104 determines whether correct authentication information has been acquired from the user (step S126; Yes→step S128). In a case where correct authentication information has not yet been acquired, the job executer 104 requests authentication information from the user (step S128; Yes→step S130). For example, the job executer 104 causes the displayer 140 to display a password input screen on which a message dialog for acquiring authentication information is displayed. Herein, in a case where a protected file is output, the job executer 104 requests authentication information necessary for reading the file. Also, in a case where a file is stored in a confidential folder, the job executer 104 requests authentication information set for the confidential folder.

Subsequently, the job executer 104 acquires authentication information input by the user (step S132). Note that, in a case where the acquired authentication information is different from set authentication information, the job executer 104 may display an error message, and then, perform processing of step S130 again, and request authentication information from the user. In a case where correct authentication information has been acquired, the job executer 104 returns to step S120 (step S132→step S120).

Note that, in a case where correct authentication information has already been acquired in step S128, the job executer 104 executes a job (step S128; No→step S134). In other words, in a case where input of authentication information is required, when an operation of executing a job has been performed for the first time, the job executer 104 requests authentication information, and executes a job without requesting authentication information, when an operation of executing the job is performed again. In this way, the job executer 104 acquires authentication information in response to execution of an operation of starting a job via a setting screen, and after acquiring the authentication information, executes the job when an operation of starting the job is performed again.

1.3 Operation Example

Figure 8A:
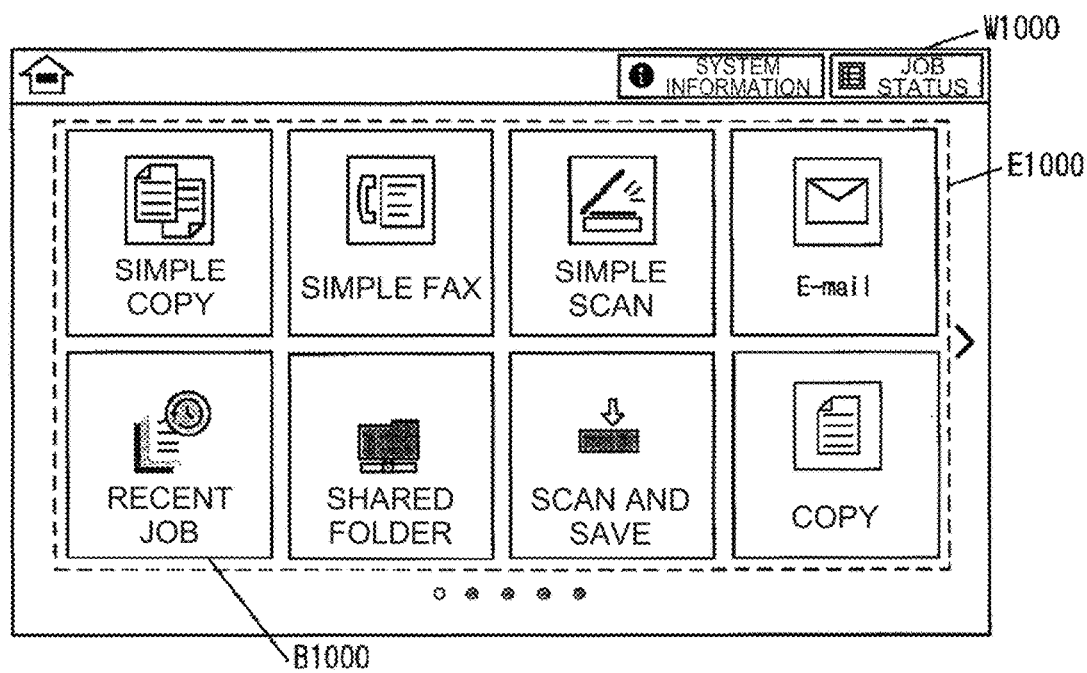
FIGS. 8A and 8B are diagrams illustrating an operation example according to the first embodiment.
Figure 8B:
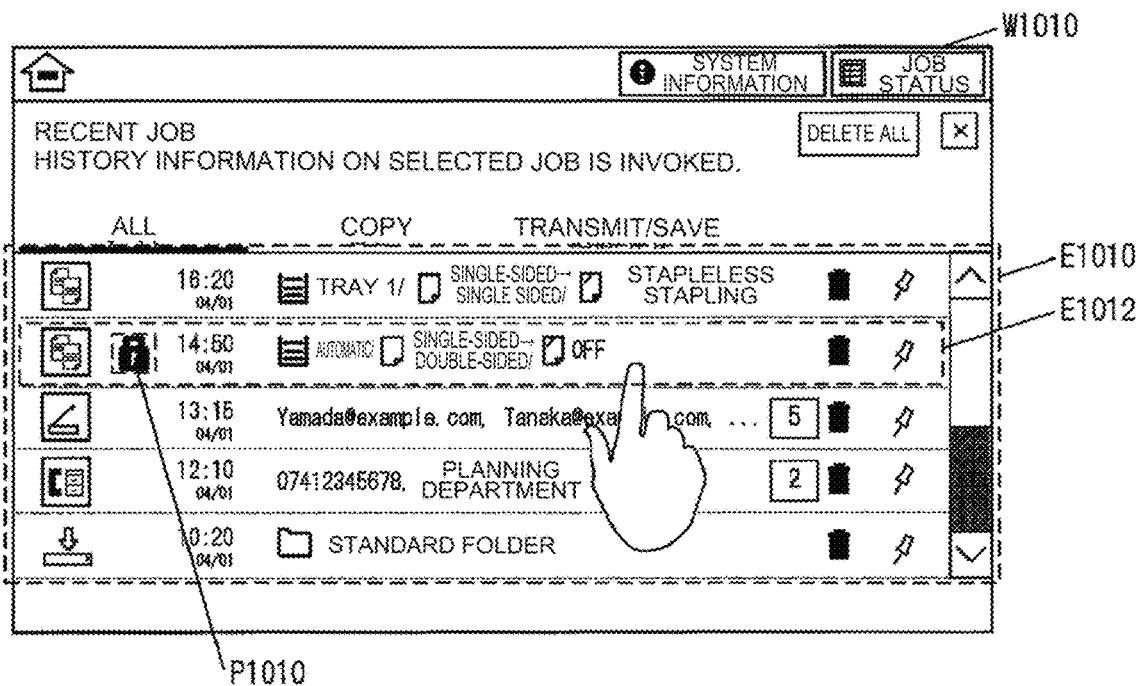

Next, an operation example according to the present embodiment is described. FIGS. 8A and 8B are diagrams illustrating a screen example of a home screen W1000. The home screen W1000 is a basic screen to be displayed on the displayer 140 when the power is turned on, in a standby mode, when the apparatus is restored from a sleep mode, and the like.

The home screen W1000 includes an area E1000 in which buttons and other members for switching an operation mode of the image processing apparatus 10 are disposed. In particular, the area E1000 includes a "recent job" button B1000 for displaying setting history information.

FIG. 8B is a diagram illustrating a screen example of a setting history information display screen W1010 to be displayed when the "recent job" button B1000 is selected by the user. The setting history information display screen W1010 displays, as a "recent job", setting history information on a recently executed job. For example, the setting history information display screen W1010 includes a list E1010, which is displayed in such a way that setting history information is selectable. The user can select one piece of selected history information from the list E1010.

The list E1010 displays setting history information for which authentication information is required, and setting history information for which authentication information is not required. This allows the user to check a content of setting history information regardless of whether authentication information is required or not. Note that, an identification indication (e.g., an icon P1010) may be displayed in setting history information for which authentication information is required. The user can recognize that setting history information in which the icon P1010 is displayed is setting history information for which authentication information is required.

In a case where the user selects one piece of setting history information E1012 included in the list E1010, a setting screen based on the selected setting history information is displayed. For example, in a case where the setting history information E1012 is setting history information on a job (confidential print job) of printing a protected file, a setting screen for printing the protected file is displayed.

Figure 9A:
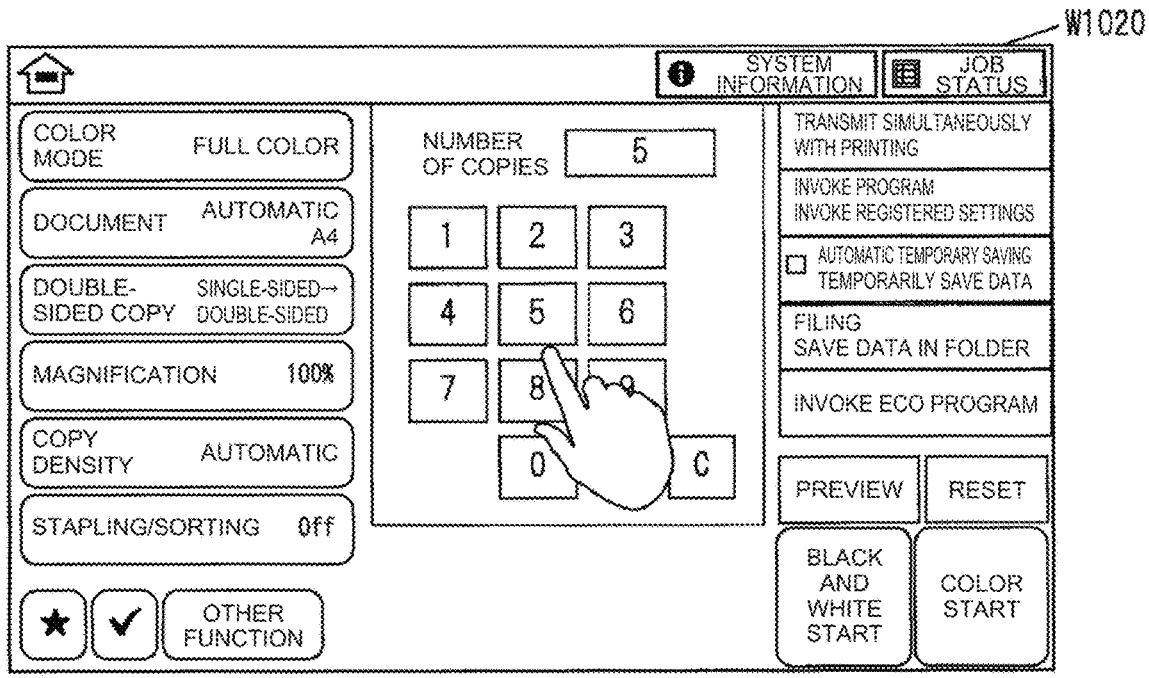
FIGS. 9A and 9B are diagrams illustrating an operation example according to the first embodiment.

FIG. 9A is a diagram illustrating a screen example of a setting screen W1020 to be displayed when the setting history information E1012 is selected. The setting screen W1020 is a basic screen for a copy function, and is a setting screen that reflects a setting value included in the setting history information E1012.

In the setting screen W1020, information on a protected file is input (held) as a setting value of a file to be output. However, at a time when the setting screen W1020 is displayed, since execution of a job of printing a protected file has not yet been determined, input of authentication information is not required. The user can change settings, such as the number of copies to be printed, via the setting screen W1020.

Figure 9B:
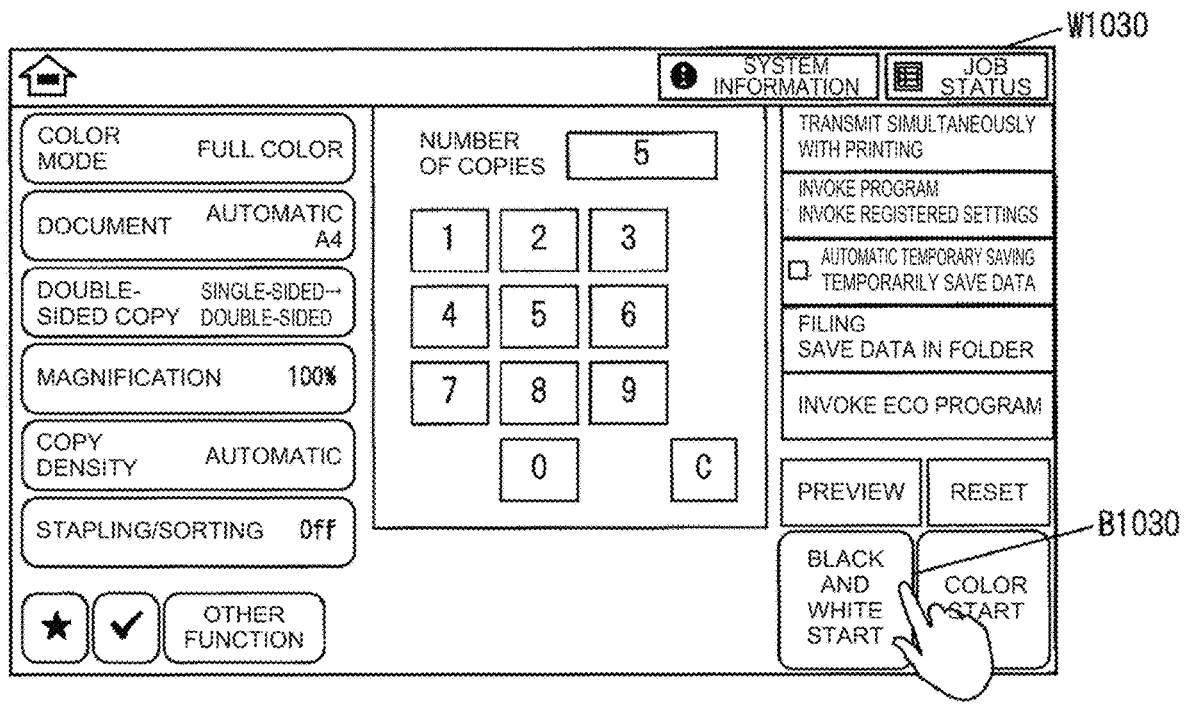

FIG. 9B is a diagram illustrating a screen example of a setting screen W1030 to be displayed when starting a job is instructed. For example, by performing an operation of selecting a "black and white start" button B1030, the user can instruct the image processing apparatus 10 to execute a job of printing a protected file. This determines execution of a job of printing a protected file, and accordingly, authentication information is requested.

Figure 10A:
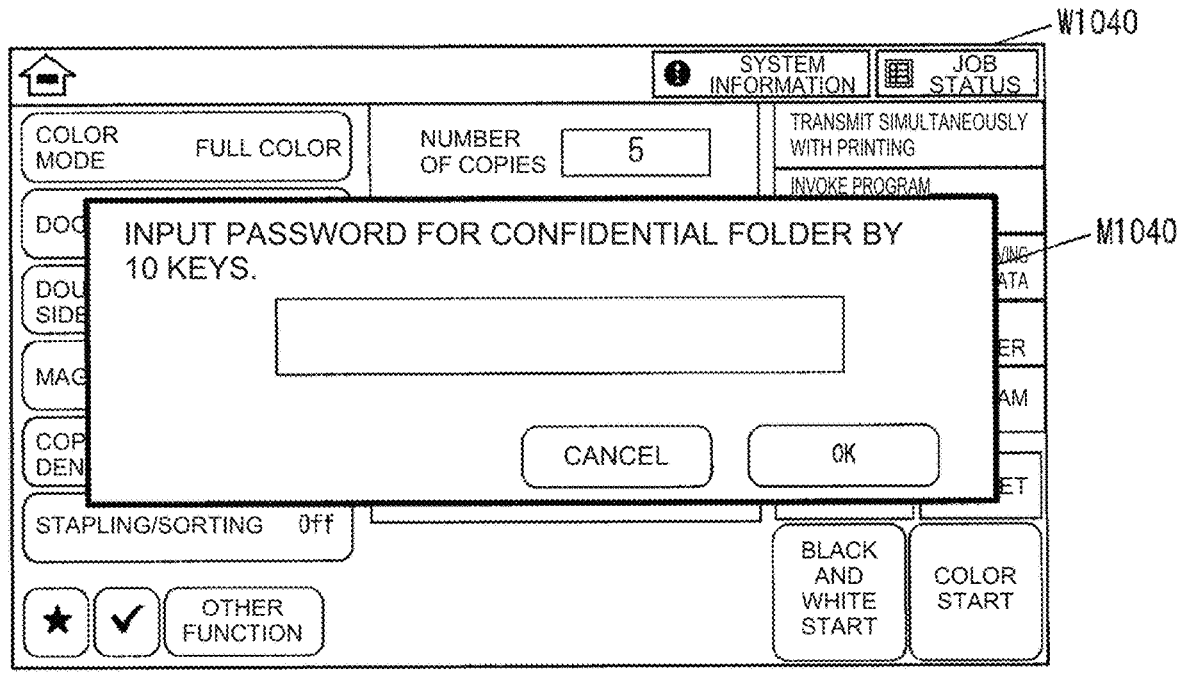
FIGS. 10A and 10B are diagrams illustrating an operation example according to the first embodiment.

FIG. 10A is a diagram illustrating a screen example of a password input screen W1040 to be displayed when input of authentication information is required. For example, in a case where a protected file is a shared file stored in a confidential folder, input of authentication information set for the confidential folder, which is necessary for reference of the confidential folder, is required. A message dialog M1040 including an input field of authentication information is displayed on the password input screen W1040. The message dialog M1040 displays a message such as "input a password for a confidential folder by 10 keys", which prompts the user to input authentication information set for the confidential folder.

Figure 10B:
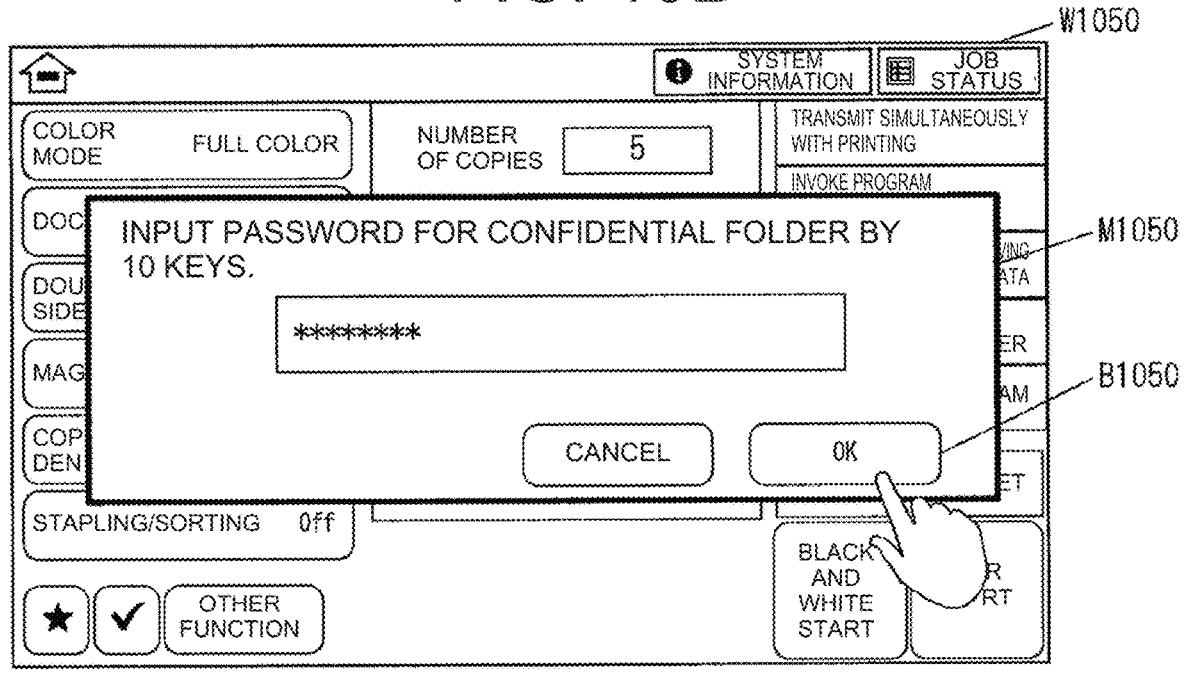

FIG. 10B is a diagram illustrating a screen example of a setting screen W1050 to be displayed when authentication information is input by the user. The user inputs authentication information in an input field included in a message dialog M1050 within the setting screen W1050, and selects an "OK" button B1050 to allow the image processing apparatus 10 to acquire authentication information. In a case where correct authentication information is acquired, the message dialog M1050 is hidden. Note that, in a case where authentication information is incorrect, a message such as "a password is incorrect" may be displayed.

Figure 11A:
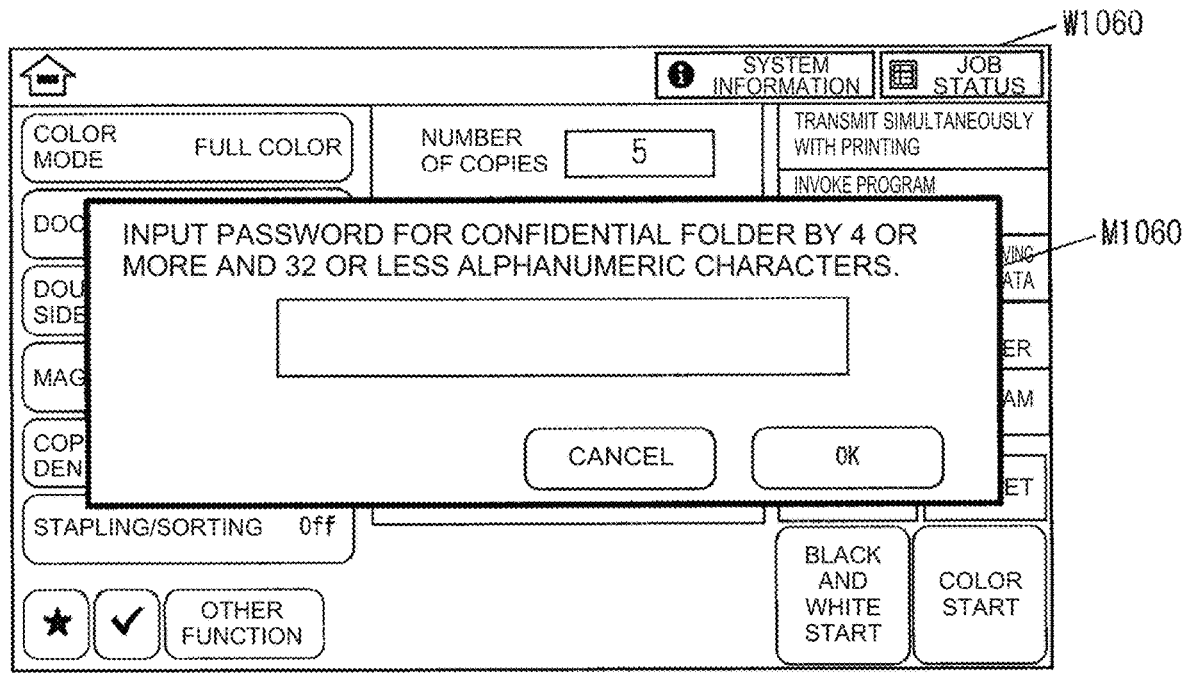
FIGS. 11A and 11B are diagrams illustrating an operation example according to the first embodiment.

Note that, in a case where a protected file is a confidentiality attribute file stored in a shared folder, as exemplified by a password input screen W1060 illustrated in FIG. 11A, a screen requesting input of authentication information set for the confidentiality attribute file is displayed. The password input screen W1060 displays a message dialog M1060 including an input field of authentication information. The message dialog M1060 displays a message such as "input a password for a confidential file by 4 or more and 32 or less alphanumeric characters", which prompts the user to input authentication information set for the confidentiality attribute file.

Note that, in a case where a protected file is a confidentiality attribute file stored in a confidential folder, the user is requested to input authentication information set for the confidential folder, and input of authentication information set for the confidentiality attribute file.

Figure 11B:
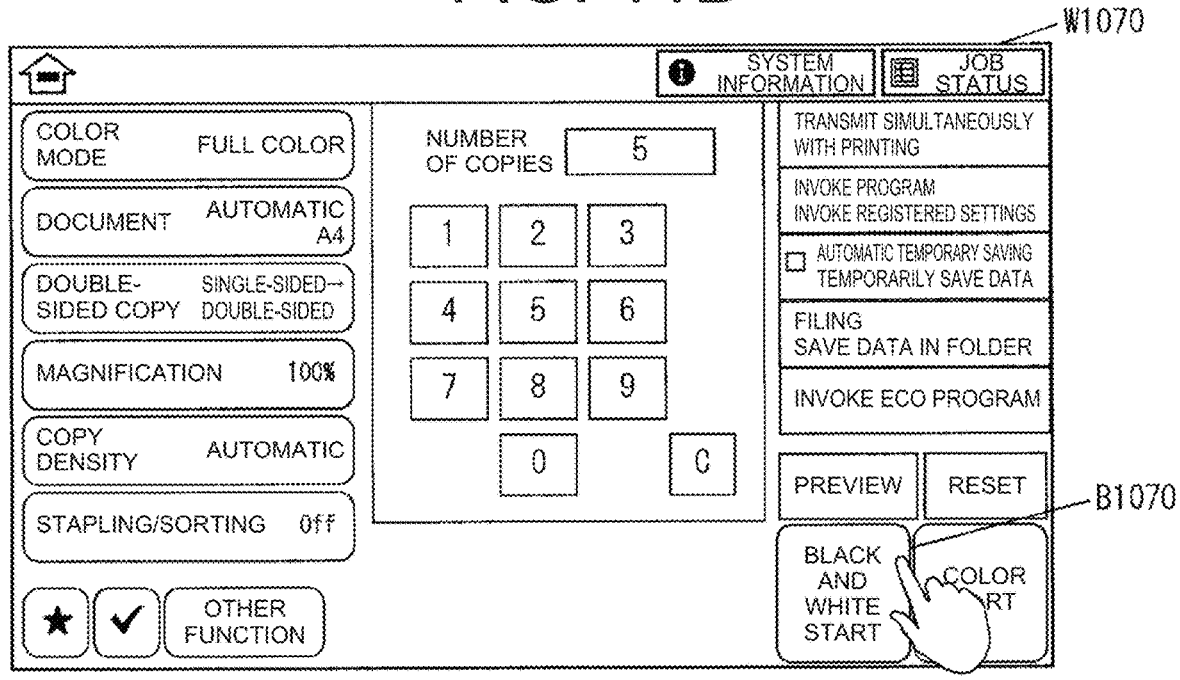

FIG. 11B is a diagram illustrating a screen example of a setting screen W1070 after correct authentication information has been acquired. By selecting a "black and white start" button B1070 again, the user can start a job with respect to the image processing apparatus 10. At this occasion, since correct authentication information has already been acquired, a job is executed without requiring input of authentication information.

This operation allows the user to select setting history information on confidential print job, and display a setting screen that reflects a setting value of the confidential print job, for example, in a case where the user execute the confidential print job again. Furthermore, since authentication information is not required at a stage of displaying a setting screen, the user can select another piece of setting history information without inputting authentication information, even when the selected setting history information is incorrect. In other words, the user can efficiently select setting history information, and confirm a setting value.

In the foregoing description, a confidential print job of printing a protected file has been described. However, authentication information is requested when starting a job is instructed regarding a job (image transmission job) of transmitting a protected file to another device.

Next, as another operation example, a case is described in which setting history information on a filing job in which image data input by the image inputter 120 are stored is selected at a time of copying or image transmission.

Figure 12A:
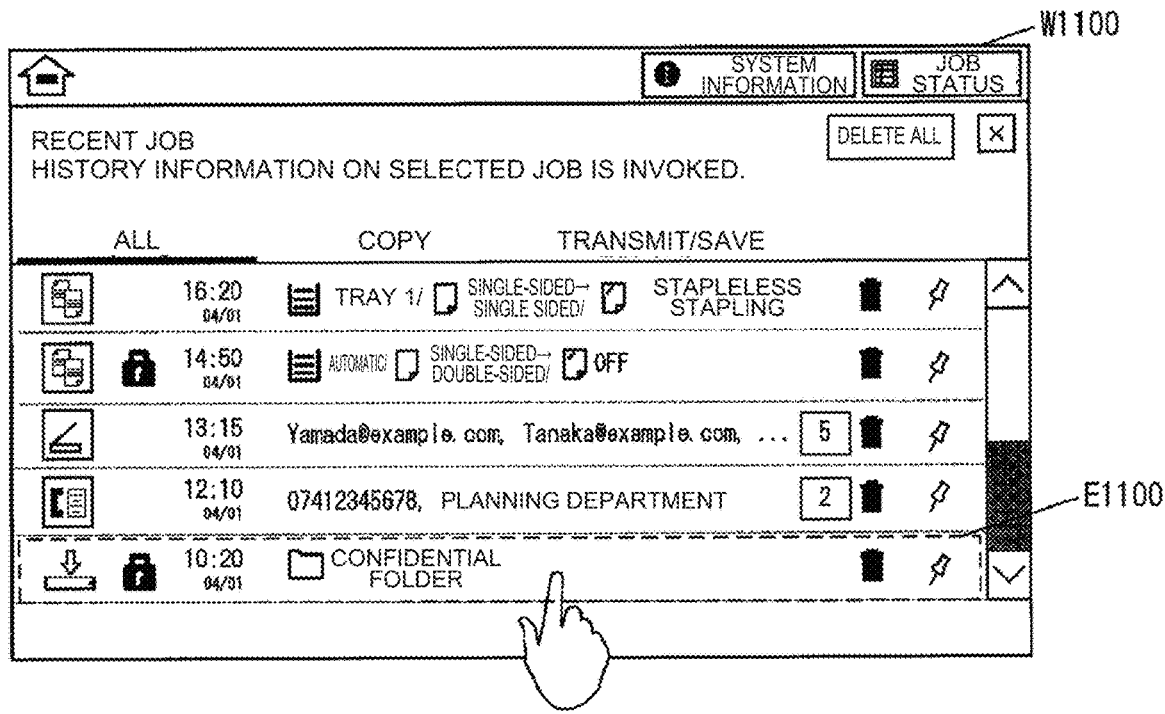
FIGS. 12A and 12B are diagrams illustrating an operation example according to the first embodiment.

FIG. 12A is a diagram illustrating a screen example of a setting history information display screen W1100. A list displayed on the setting history information display screen W1100 includes setting history information E1100 on a filing job in which image data are stored in a confidential folder at a time of copying.

Figure 12B:
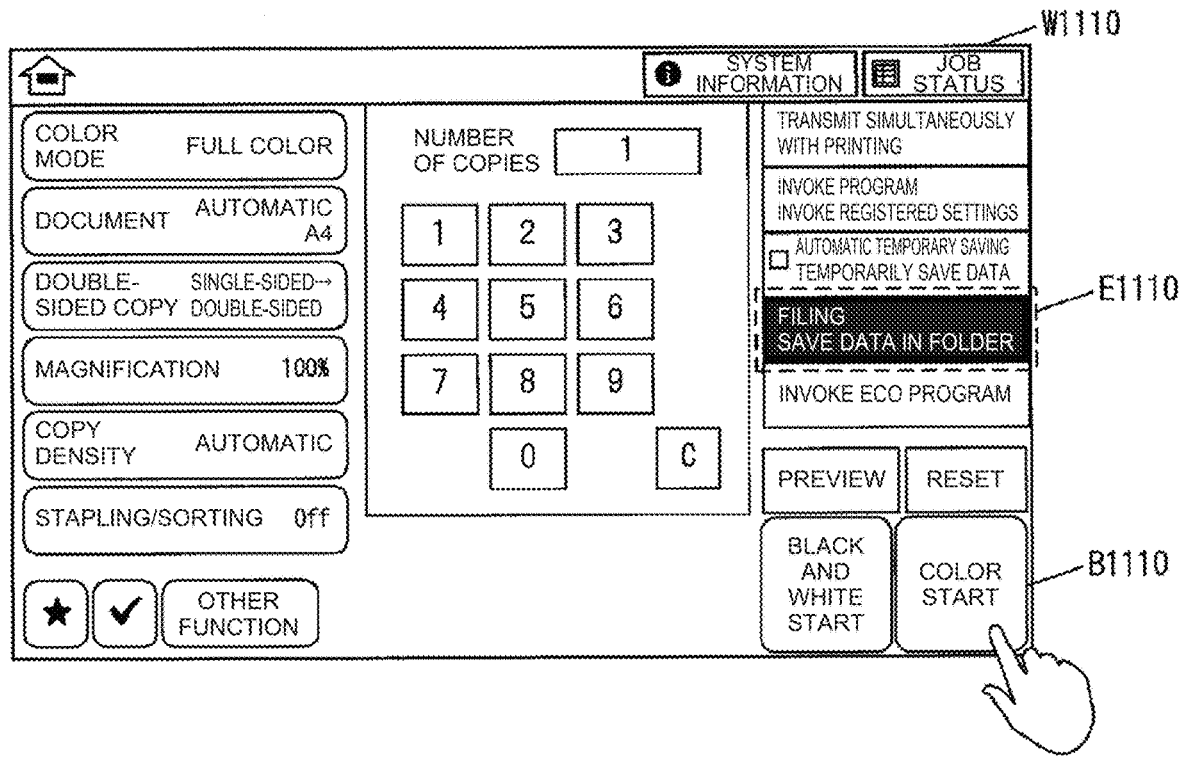

FIG. 12B is a diagram illustrating a screen example of a setting screen W1110 to be displayed in a case where the setting history information E1100 is selected. The setting screen W1110 is a basic screen for a copy function. An area E1110 of the setting screen W1110 indicates that setting for filing a file of image data is enabled. In addition, information on a confidential folder is set, as a setting value of a storage destination of a file on the setting screen W1110. However, at a time when the setting screen W1110 is displayed, since execution of a filing job of storing a file in a confidential folder has not yet been determined, input of authentication information is not requested.

By performing an operation of selecting a "color start" button B1110, the user can instruct the image processing apparatus 10 to execute a filing job of storing a file in a confidential folder. Thus, since execution of a filing job of storing a file in a confidential folder is determined, authentication information is requested.

Figure 13A:
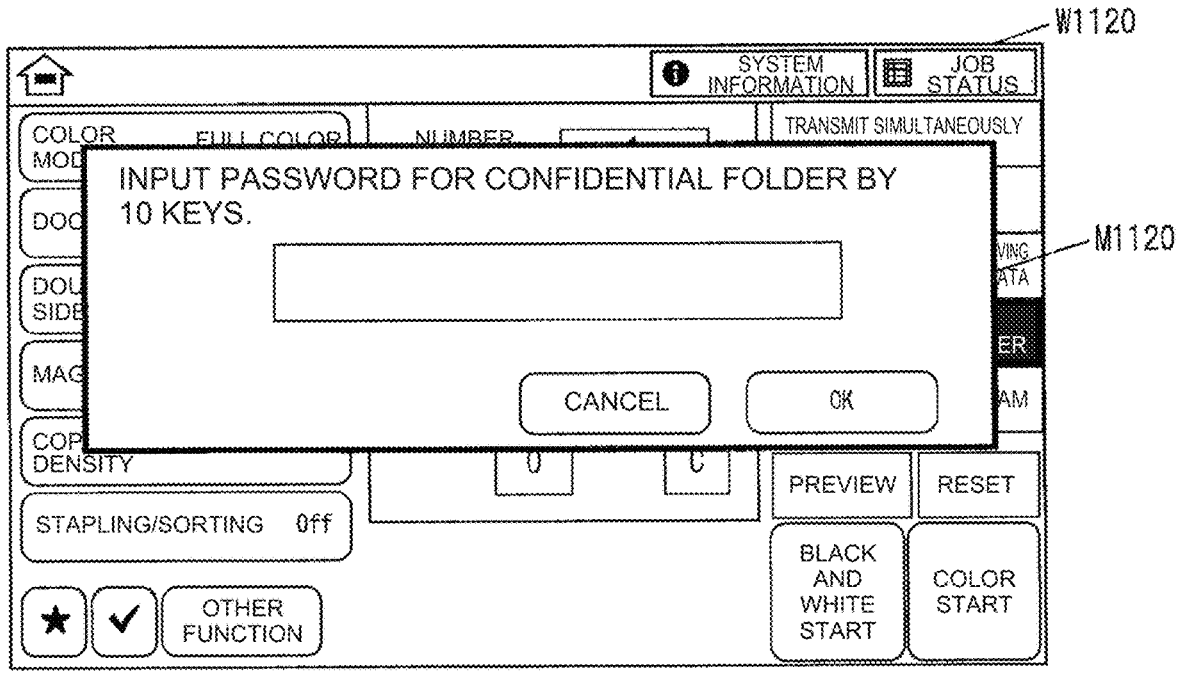
FIGS. 13A and 13B are diagrams illustrating an operation example according to the first embodiment.

FIG. 13A is a diagram illustrating a screen example of a password input screen W1120 to be displayed when input of authentication information is required. Since a storage destination of a file is a confidential folder, the password input screen W1120 displays a message dialog M1120 for inputting authentication information set for the confidential folder.

When correct authentication information is input, and the "color start" button is selected again, copying is performed, and image data of a document read at a time of copying is stored in the confidential folder.

Note that, in a case where a file to be determined from a storage destination of a file and a file name included in setting values of selected setting history information is a confidentiality attribute file, a state that a setting value indicating storing the confidentiality attribute file is set may be held on a setting screen. In this case, when the "color start" button is selected, the user may be requested to input authentication information to be set for a file of image data to be newly stored.

Figure 13B:
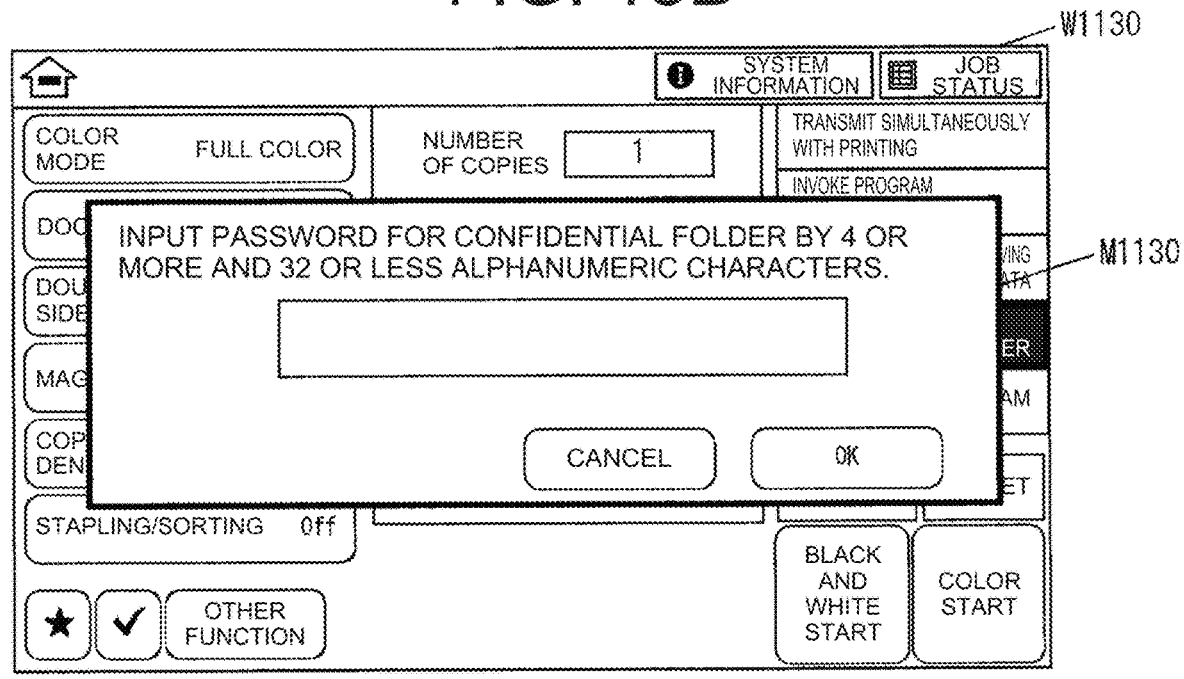

FIG. 13B is a diagram illustrating a screen example of a password input screen W1130 to be displayed when the "color start" button is selected in a state that a setting value indicating storing a confidentiality attribute file is set. The password input screen W1130 displays a message dialog M1130 for inputting authentication information to be set for a file of image data to be newly stored. The user can input a password via the message dialog M1130, and set authentication information to be set for a file. After a password is input, by performing an operation of executing a job again, a confidentiality attribute file for which the password is set is stored.

As yet another example, a case is described in which setting history information on a filing job in which scanned image data are stored is selected.

Figure 14A:
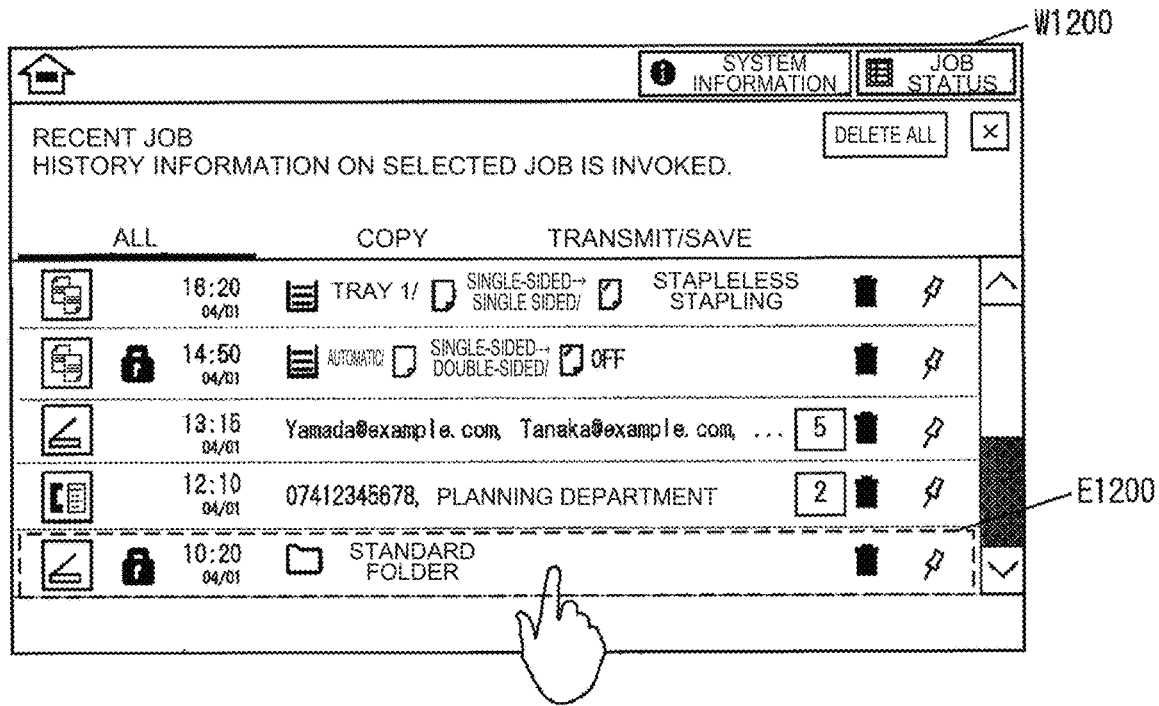
FIGS. 14A and 14B are diagrams illustrating an operation example according to the first embodiment.

FIG. 14A is a diagram illustrating a screen example of a setting history information display screen W1200. A list displayed on the setting history information display screen W1200 includes setting history information E1200 on a filing job in which scanned image data are stored in a confidential folder.

Figure 14B:
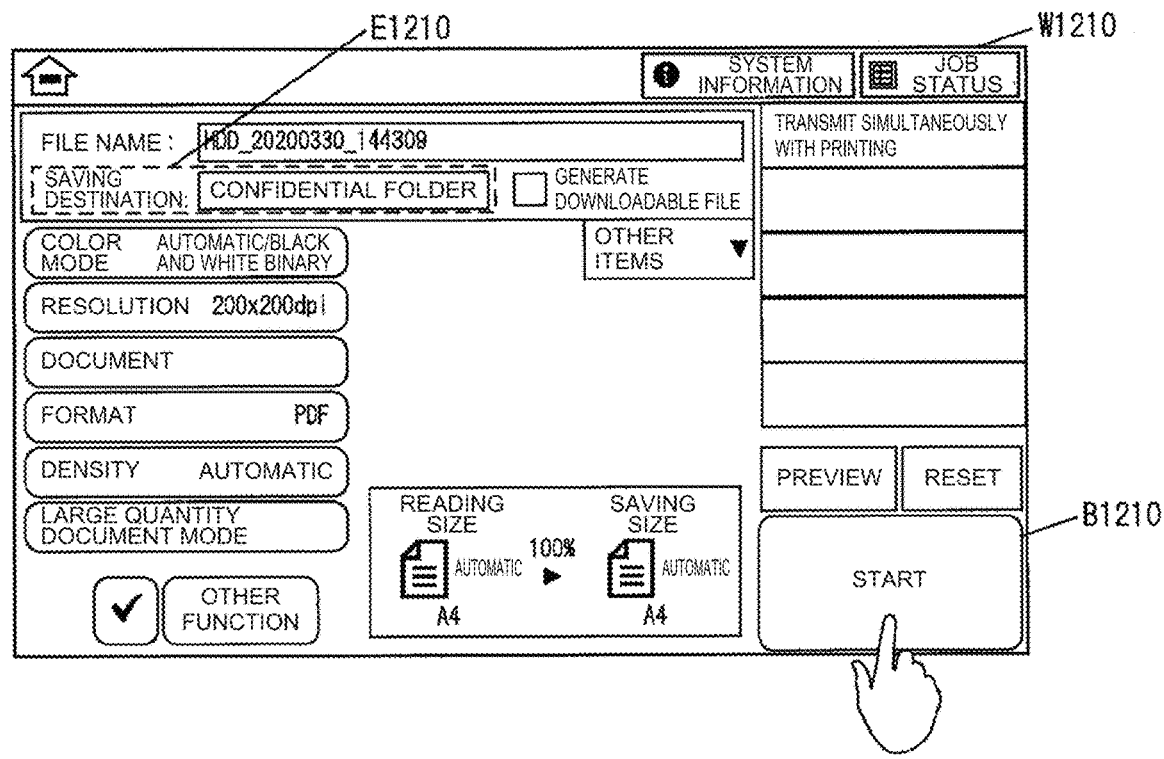

FIG. 14B is a diagram illustrating a screen example of a setting screen W1210 to be displayed when the setting history information E1200 is selected. The setting screen W1210 is a basic screen for a scan and save function. As illustrated in an area E1210 of the setting screen W1210, a state that information on a confidential folder is set (input) is held as a storage destination of a file of scanned image data. At this point of time, since execution of a filing job of storing a file in the confidential folder has not yet been determined, input of authentication information is not requested.

By performing an operation of selecting a "start" button B1210, the user can instruct the image processing apparatus 10 to execute a filing job of storing a file in a confidential folder. Thus, since execution of a filing job of storing a file in a confidential folder is determined, authentication information is requested.

Figure 15A:
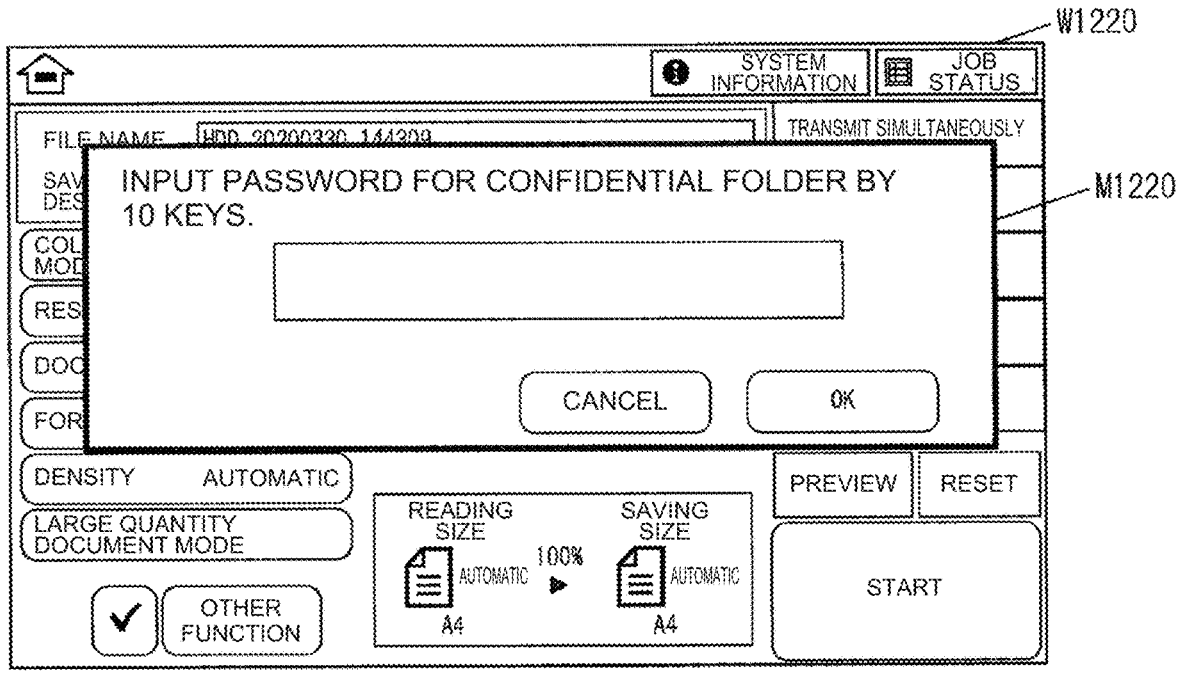
FIGS. 15A and 15B are diagrams illustrating an operation example according to the first embodiment.

FIG. 15A is a diagram illustrating a screen example of a password input screen W1220 to be displayed when input of authentication information is required. Since a storage destination of a file is a confidential folder, the password input screen W1220 displays a message dialog M1220 for inputting authentication information set for the confidential folder.

When correct authentication information is input, and the "start" button is selected again, scanning is performed, and image data of a document read at a time of scanning are stored in a confidential folder, as a PDF file or an image file of a generally used format.

Note that, in a case where a saving format of a file is an encrypted PDF, or in a case where a file to be determined from a storage destination of a file and a file name included in setting values of selected setting history information is a confidentiality attribute file, input of a password for an encrypted PDF, or authentication information to be set for a file may be requested.

Figure 15B:
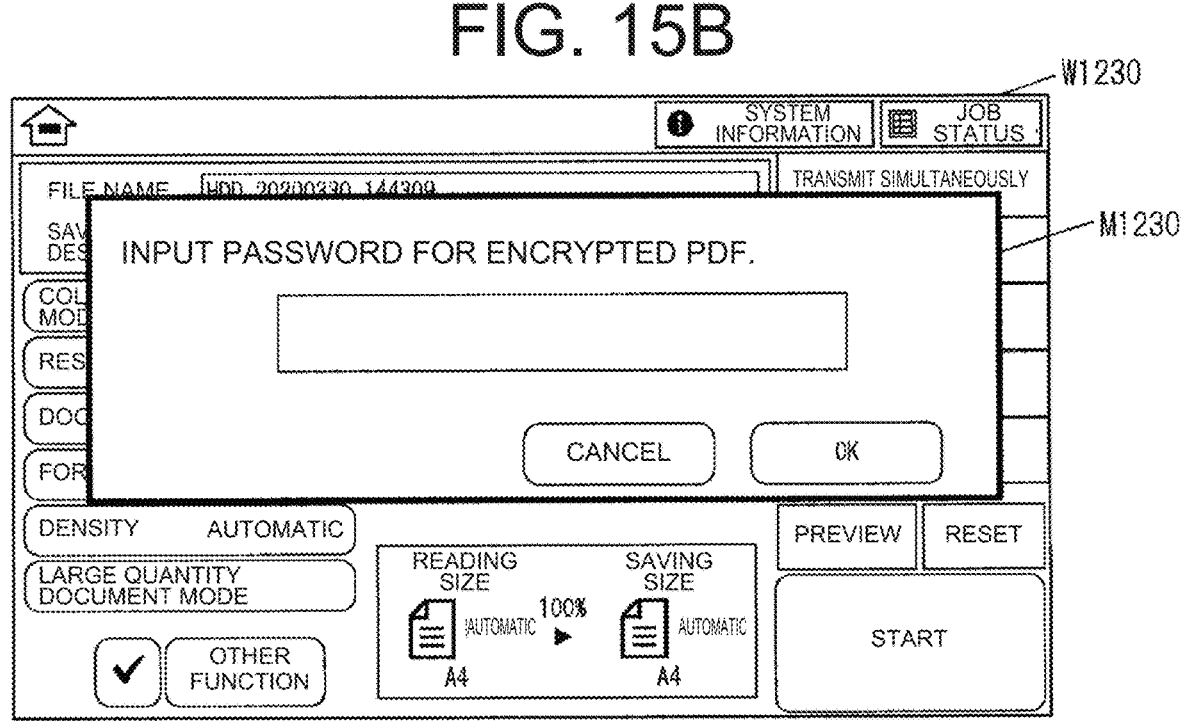

FIG. 15B is a diagram illustrating a screen example of a password input screen W1230 on which a message dialog M1230 including an input field for inputting a password for an encrypted PDF, or authentication information to be set for a file is displayed. The password input by the user is set as a password for an encrypted PDF, or authentication information for a file to be stored.

Note that, in the embodiment described above, a timing at which input of authentication information is required is assumed to be a time when an operation of starting a job is performed. However, a timing at which input of authentication information is required may be any timing during a period from a time when setting history information is selected until a job based on the setting history information is executed. For example, a timing at which input of authentication information is requested may be a timing when settings are changed by the user (step S122 in FIG. 7).

Further, in the embodiment described above, authentication information is assumed to be a password or a PIN. In this case, a means (authentication means) for inputting authentication information is knowledge authentication. However, an authentication means may be belongings authentication or biometric authentication.

In this way, the image processing apparatus according to the present embodiment can display setting history information on a job of outputting a protected file, or storing a file in an area where authentication information is required at a time of reference, without requiring input of authentication information. In addition, the image processing apparatus according to the present embodiment does not immediately require authentication information, even when a setting screen that reflects a setting value included in setting history information is displayed, but rather requests authentication information before a job is executed (e.g., before printing is started). Thus, the image processing apparatus according to the present embodiment easily allows the user to check a setting value, and maintain usability.

On the other hand, the image processing apparatus according to the present embodiment requests authentication information before a job is executed after a setting screen based on setting history information on a job of outputting a protected file or storing a file in an area where authentication information is required at a time of reference is displayed. This allows to secure confidentiality and secrecy of a protected file, and restrict an access to a confidential folder.

In particular, setting history information on a job concerning a file (job data) for which authentication information is required may involve a security problem, when the setting history information is invoked unconditionally. Therefore, for security reasons, setting history information on a job concerning a file for which authentication information is required may be displayed only after authentication information has been input, or even when setting history information is displayed, authentication information may be requested before a setting screen that reflects a setting value is displayed. However, even when setting history information on a job concerning a file for which authentication information is required is invoked, execution of the job based on the setting history information has not yet been determined. Therefore, by requesting authentication information in a state that execution of a job has not yet been determined, an unnecessary request for input of authentication information may occur, which may impair usability. In the image processing apparatus according to the present embodiment, requesting authentication information after a setting screen based on setting history information is displayed and before a job is executed makes it possible to maintain usability while securing security.

2. Second Embodiment

Next, a second embodiment is described. In addition to processing described in the first embodiment, the second embodiment is an embodiment in which authentication information is requested before displaying image data indication such as a preview indication or a thumbnail indication of a protected file (e.g., image data). The present embodiment is an embodiment in which FIG. 7 is replaced with FIG. 16. Note that, same processing is indicated with a same reference sign, and description thereof is omitted.

Figure 16:
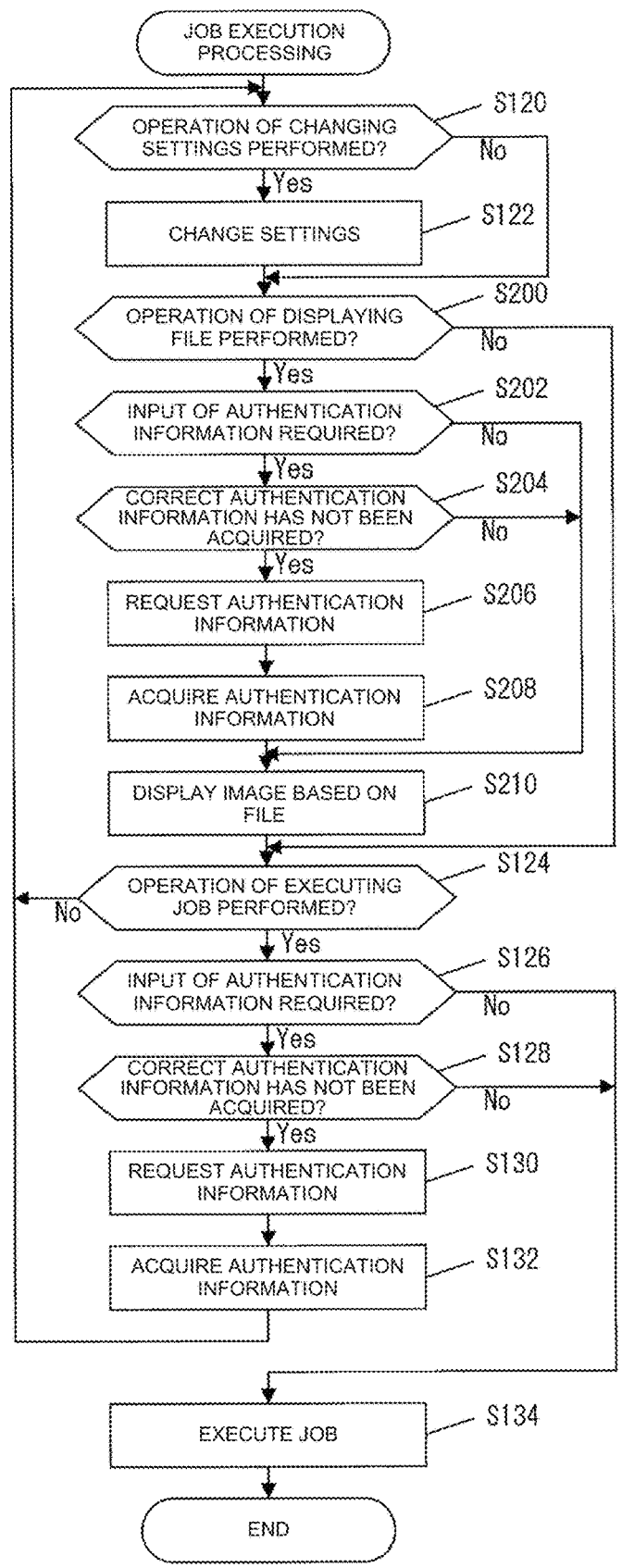
FIG. 16 is a flowchart illustrating a flow of job execution processing according to a second embodiment.

Referring to FIG. 16, job execution processing according to the present embodiment is described. A job executer 104 performs processing of step S120 or step S122, and then determines whether an operation of displaying a file has been performed (step S200). An operation of displaying a file is, for example, an operation of displaying a preview image or a thumbnail image based on a file. Further, a file to be displayed is a file associated with setting history information selected by the user in step S106 in FIG. 6, and is a file to be determined by information related to a storage destination of a file and a file name stored in setting values of the setting history information.

Subsequently, the job executer 104 determines whether input of authentication information is required, based on a determination result in step S112 and step S114 in FIG. 6 (step S202). In a case where input of authentication information is not required, the job executer 104 displays an image based on a file (step S202; No→step S210).

On the other hand, in a case where input of authentication information is required, the job executer 104 determines whether correct authentication information has been acquired (step S202; Yes→step S204). In a case where correct authentication information has not yet been acquired, the job executer 104 requests authentication information from the user (step S204; Yes→step S206), and acquires authentication information input by the user (step S208). In a case where correct authentication information has been acquired, the job executer 104 displays an image based on a file (Step S210). Note that, pieces of processing from step S202 to step S208 are similar to pieces of processing from step S126 to step S132.

Note that, in a case where the job executer 104 has already acquired correct authentication information in step S204, pieces of processing of steps S206 and S208 are omitted, and an image based on a file is displayed (step S204; No→step S210).

Note that, in a case where authentication information has been acquired in step S208, the job executer 104 determines that correct authentication information has been acquired in processing of step S128. In this case, the job executer 104 can execute a job without requesting authentication information when executing the job.

As an operation example according to the present embodiment, for example, in the image processing apparatus 10, an operation of selecting a preview button included in the setting screen W1020 illustrated in FIG. 9A of the first embodiment is equivalent to an operation of displaying a file. In a case where a preview button is selected, the image processing apparatus 10 acquires authentication information, and after acquisition of the authentication information, the image processing apparatus 10 displays a preview image of a file associated with setting history information selected by the user.

In the image processing apparatus according to the present embodiment, in a case where image data based on a protected file are displayed, confidentiality and secrecy of the file can be secured by requesting authentication information. On the other hand, since the user can check image data based on a protected file, the user can more clearly recognize a content of a file associated with selected setting history information.

3. Third Embodiment

Figure 17:
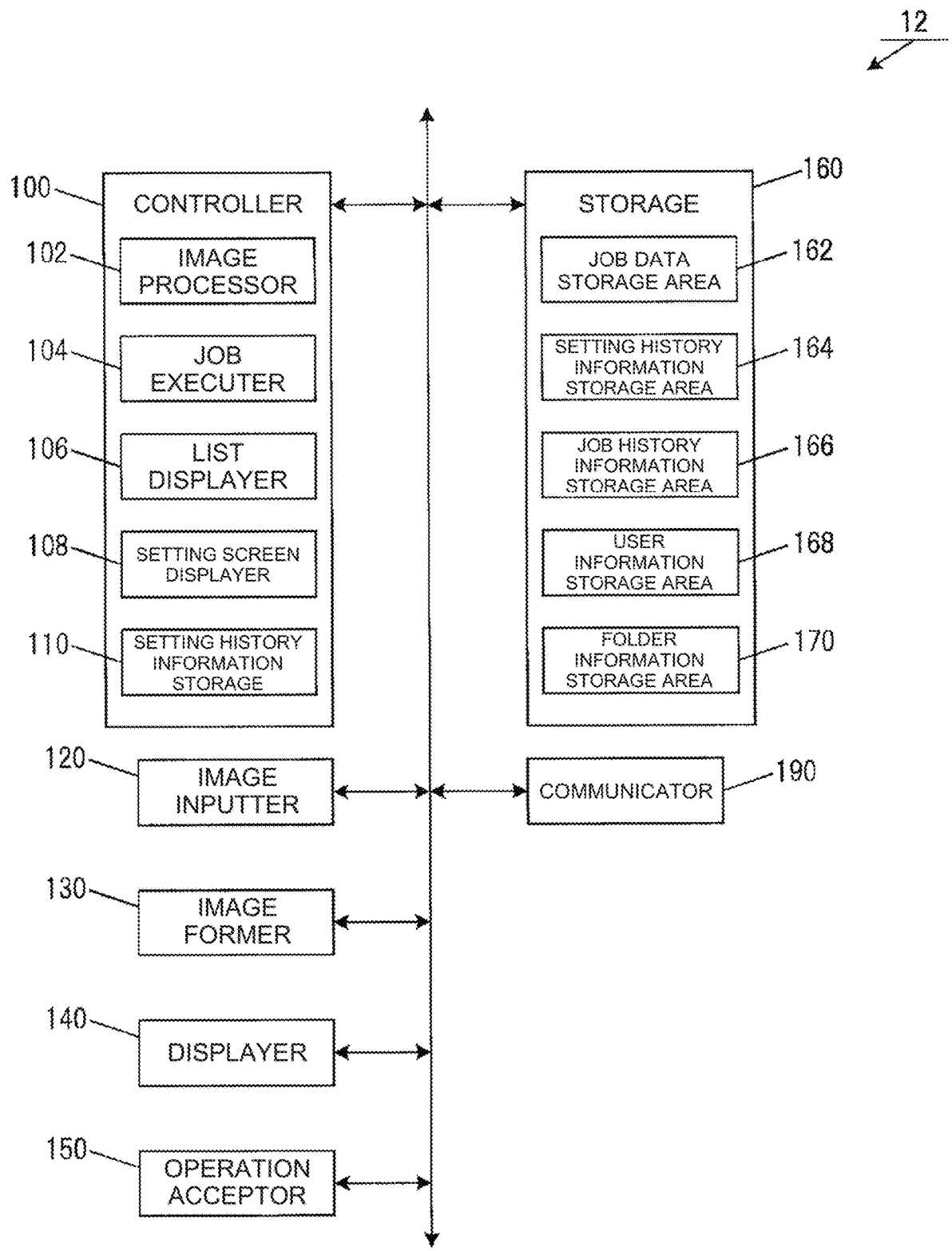
FIG. 17 is a diagram illustrating a functional configuration of an image processing apparatus according to a third embodiment.
Figure 18:
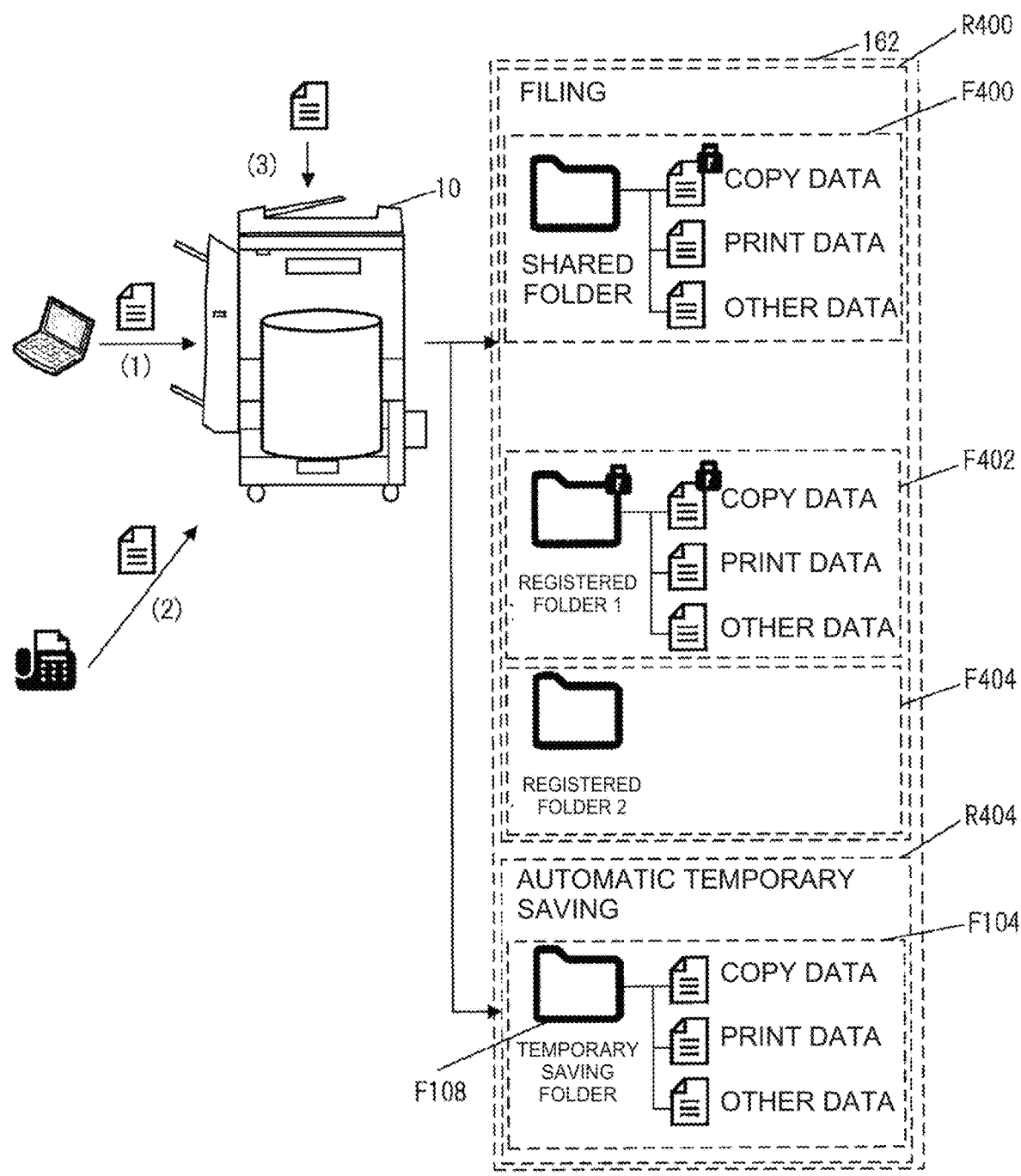
FIG. 18 is a conceptual diagram of a job data storage area according to the third embodiment.

Next, a third embodiment is described. The third embodiment is an embodiment in which a user authentication function is provided in the image processing apparatus according to the first embodiment. The present embodiment is an embodiment in which FIG. 2 is replaced with FIG. 17, FIG. 3 is replaced with FIG. 18, FIG. 4 is replaced with FIG. 21, and FIG. 6 is replaced with FIG. 22, respectively. Note that, a same functional unit and same processing are indicated with a same reference sign, and description thereof is omitted.

3.1 Functional Configuration

Referring to FIG. 17, a functional configuration of an image processing apparatus 12 according to the present embodiment is described. Unlike the image processing apparatus 10, in the image processing apparatus 12, a storage 160 further secures, as storage areas, a user information storage area 168, and a folder information storage area 170.

First, referring to FIG. 18, an overview of a job data storage area 162 according to the present embodiment is described. In the present embodiment, similarly to the first embodiment, a storage area (e.g., R400 in FIG. 16) for filing, and a storage area (e.g., R404 in FIG. 16) for automatic temporary saving are secured.

A storage area for filing includes, as filing folders, a standard folder (e.g., "standard folder" F400 in FIG. 16), and a user folder (e.g., "registered folder 1" F402 and "registered folder 2" F404 in FIG. 16). A standard folder is a shared folder available to any user. On the other hand, a user folder is a folder available to a user authenticated by the image processing apparatus 12. A user can register one or more folders for use, as a registered folder.

For example, a certain user registers, as folders for use, the registered folder 1 and the registered folder 2. In this case, the user can designate either a standard folder, or the registered folder 1 or the registered folder 2, which is a user folder of himself/herself, and store a file in which a file name, a user name, and the like are set. Note that, both of a standard folder and a user folder can store a confidentiality attribute file and a shared file.

Further, when user information is stored in the image processing apparatus 12 (e.g., at a time of registering an account user), any user folder may be designated as my folder of the user. My folder is a folder to be designated as a default storage destination of a file. My folder may be browsable by a simple operation such as a shortcut function of a folder.

Further, a folder type of a user folder may be either a shared folder or a confidential folder. For example, the registered folder 1 may be a confidential folder, and the registered folder 2 may be a shared folder. A type of a folder may be set by the user, or may be set by an administrator of the image processing apparatus 12. Information indicating whether a user folder is a shared folder or a confidential folder is stored in folder information to be described later, as a folder type.

The user information storage area 168 stores information (user information) on a user who uses the image processing apparatus 12. As illustrated in FIG. 19, for example, user information includes a user ID (e.g., "user A"), which is information used for authenticating the user, a user name (e.g., "user A") of the user, a password (e.g., "abc123"), and a name of my folder (e.g., "registered folder 1") of the user, which is information used for authenticating the user.

Note that, my folder may be stored by the user, or may not be stored. Further, user information may also include information other than the information described above.

The folder information storage area 170 stores information (folder information) on a folder included in the job data storage area 162. As illustrated in FIG. 20, folder information includes, for example, a user ID (e.g., "user A"), a registered name of a folder (e.g., "registered folder 1"), a path (e.g., "/usr/UserA/fld1") indicating a location of the folder, a folder type (e.g., "confidential folder"), and a folder password (e.g., "aaa12345"), which is authentication information on the folder.

In the present embodiment, either one of "confidential folder", "shared folder", and "protected folder" is stored as a folder type. Folder information whose folder type is "confidential folder" indicates that a folder to be determined by the path included in the folder information is a confidential folder. Likewise, folder information whose folder type is "shared folder" indicates that a folder to be determined by a path included in the folder information is a shared folder. Also, folder information whose folder type is "protected folder" indicates that a folder is a folder that prohibits an editing operation such as moving or deleting a page of a file stored in a folder to be determined by a path included in the folder information, or inserting a blank page. Note that, in the present embodiment, a folder whose folder type is "protected folder" is assumed to be a kind of shared folder.

In addition, as illustrated in FIG. 20, the folder information storage area 170 may store folder information on a standard folder (D400 in FIG. 20), and a temporary storage folder (D402 in FIG. 20).

Next, setting history information according to the present embodiment is described with reference to FIG. 21. As illustrated in FIG. 21, setting history information according to the present embodiment includes a job ID (e.g., "0025") for identifying a job, a type (e.g., "print") of an executed job, a user ID (e.g., "user A") for identifying a user who executed the job, setting values (e.g., "output tray: tray 1, single-sided or double-sided: single-sided→single-sided, stapling: stapleless stapling, storage destination: registered folder 1, file name: Copy_20210401_162050") at a time of execution of the job, and an execution date and time (e.g., "2021/04/01 16:20:50") of the job.

In this way, in the present embodiment, setting history information is associated with information on a user who executed a job, setting values, and a job type. Therefore, for example, setting history information indicated by D300 in FIG. 21 indicates a print job of outputting, to the registered folder 1 of a user whose user ID is "user A", job data having a file name "Copy_20210401_162050".

3.2 Flow of Processing

Figure 22:
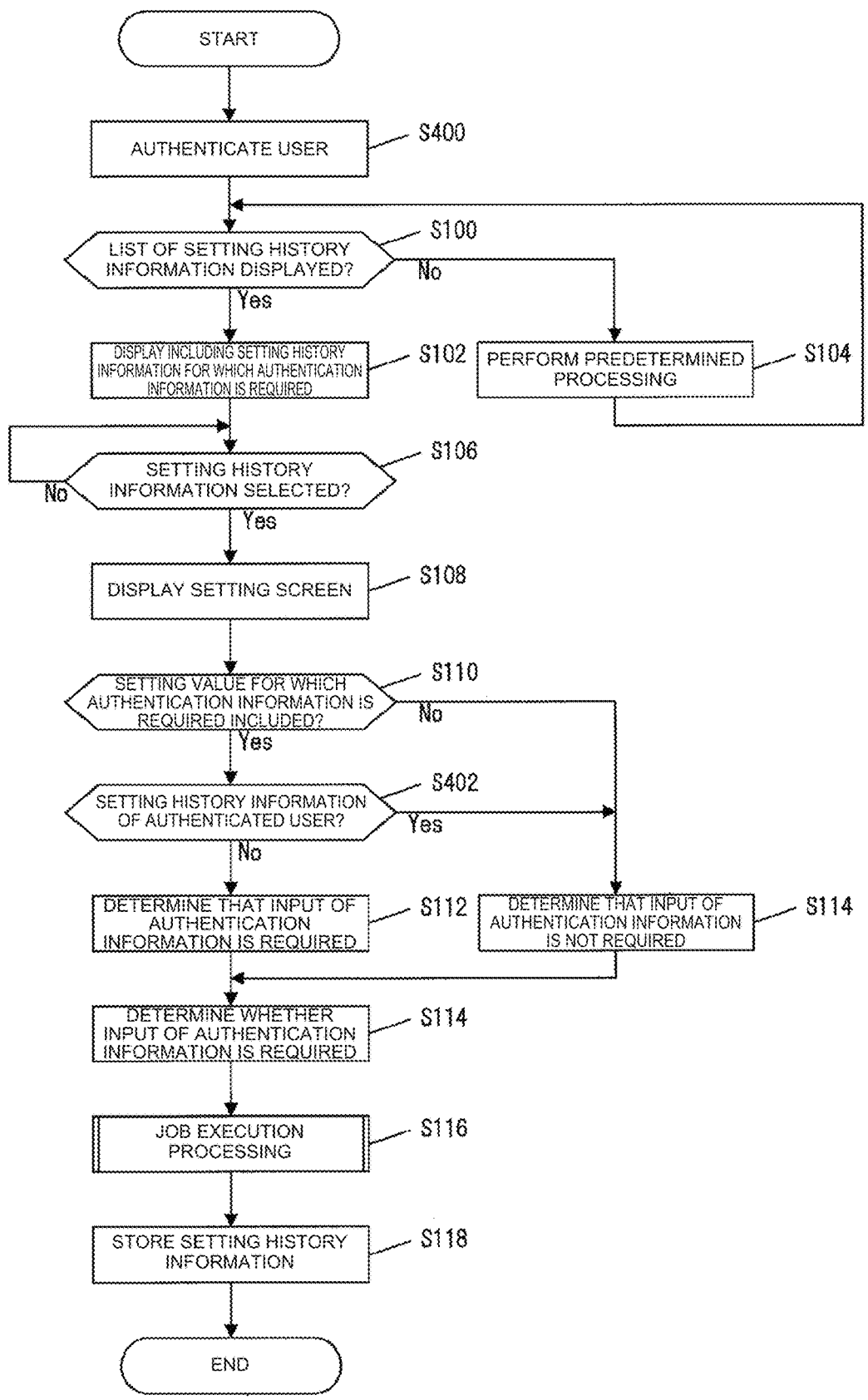
FIG. 22 is a flowchart illustrating a flow of processing of the image processing apparatus according to the third embodiment.

Next, primary processing (main processing) to be performed by the image processing apparatus 12 according to the present embodiment is described with reference to FIG. 22. Note that, in the image processing apparatus 12 according to the present embodiment, user authentication function is assumed to be enabled. Further, in the image processing apparatus 12, it is assumed that a function of sharing setting history information is achieved among a plurality of users. Note that, a group of users who share setting history information are assumed to be set in advance.

First, a controller 100 performs user authentication (step S400). For example, the controller 100 displays, on a displayer 140, a screen (login screen) for allowing the user to input a user ID and a password. The controller 100 acquires the user ID and the password input by the user via the login screen, and determines whether user information including the acquired ID and password is stored in the user information storage area 168. In a case where user information including the acquired user ID and password is stored, the controller 100 authenticates the user to be identified by the user ID, and determines the user operating the image processing apparatus 12.

After authenticating the user, the controller 100 performs pieces of processing from steps S100 to S108. Note that, the controller 100 (list displayer 106) displays, in step S102, setting history information including either of a user ID of a user authenticated in step S400, or a user ID of another user sharing the setting history information with the user.

In a case where the controller 100 determines that setting history information selected by the user includes a setting value for which authentication information is required (step S110; Yes), the controller 100 determines whether the setting history information is setting history information on the user authenticated in step S400 (step S402).

For example, in a case where a user ID included in setting history information selected by the user matches a user ID of the user authenticated in step S400, the controller 100 determines that the setting history information is setting history information on the authenticated user. In this case, setting history information selected by the user is setting history information on a job executed by the user himself/herself. On the other hand, in a case where a user ID included in setting history information selected by the user does not match the user ID of the user authenticated in step S400, the controller 100 determines that the setting history information is not setting history information on the authenticated user. In this case, setting history information selected by the user is setting history information on a job executed by a user other than the user.

In a case where setting history information selected by the user is setting history information on the authenticated user, the controller 100 determines that input of authentication information is not required (step S402; Yes→step S114). In other words, the controller 100 determines that authentication required for reading a protected file, or authentication required for referring to a confidential folder associated with an authenticated user has been made.

On the other hand, in a case where setting history information selected by the user is not setting history information on the authenticated user, the controller 100 determines that input of authentication information is required (Step S402; No→step S112).

3.3 Operation Example

Next, an operation example according to the present embodiment is described. In the description on the operation example according to the present embodiment, the user A and the user B are assumed to be members of a group sharing setting history information.

In the present embodiment, user authentication is performed by the image processing apparatus 12, and a user operating the image processing apparatus 12 is determined. For example, the user A is determined to be a user operating the image processing apparatus 12. Also, the user A can execute a job (filing job) of storing a file.

Figure 23:
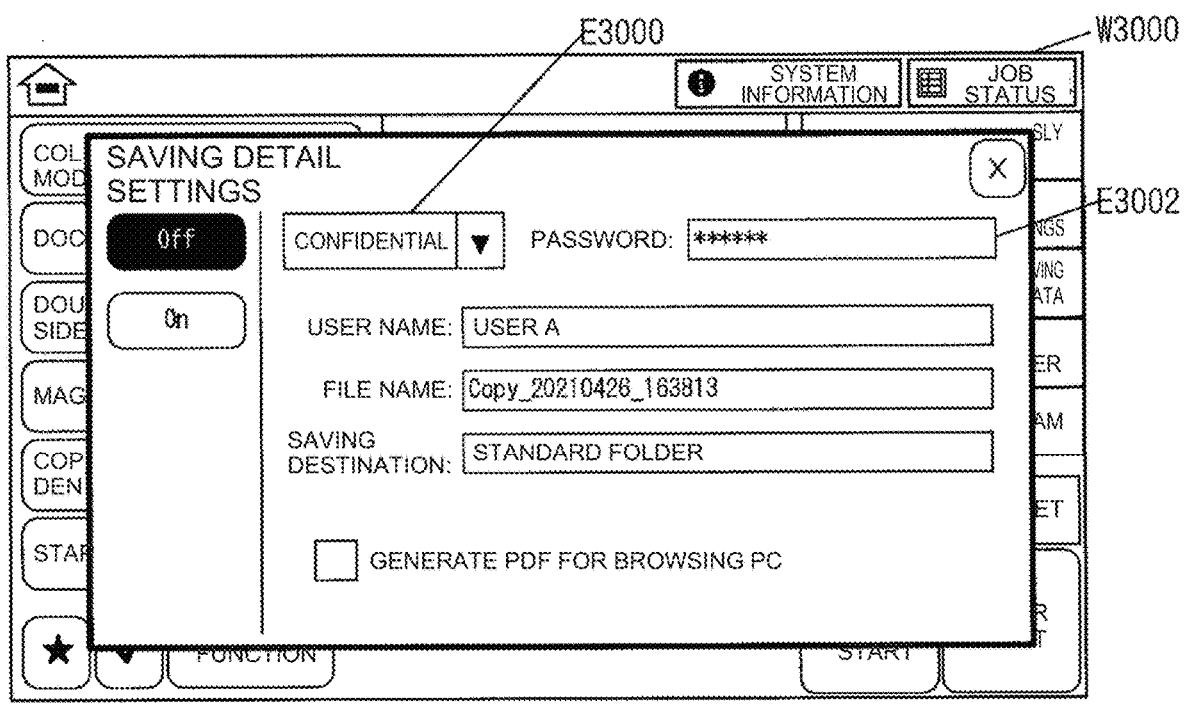
FIG. 23 is a diagram illustrating an operation example according to the third embodiment.

For example, FIG. 23 is a diagram illustrating a screen example of a setting screen W3000 for a scan and save function. The user A stores a file of scanned image data, as a confidentiality attribute file. At this occasion, as settings concerning storing a file, the user A may select "confidential" (e.g., E3000 in FIG. 23), as an attribute value of confidential setting, or set a password (authentication information) (e.g., E3002 in FIG. 23). Thus, a file of scanned image data is stored as a protected file.

In addition, the user A can print a protected file. Thus, a job (confidential print job) of printing a protected file can be executed. Consequently, setting history information on a job of printing a protected file is stored.

Figure 24A:
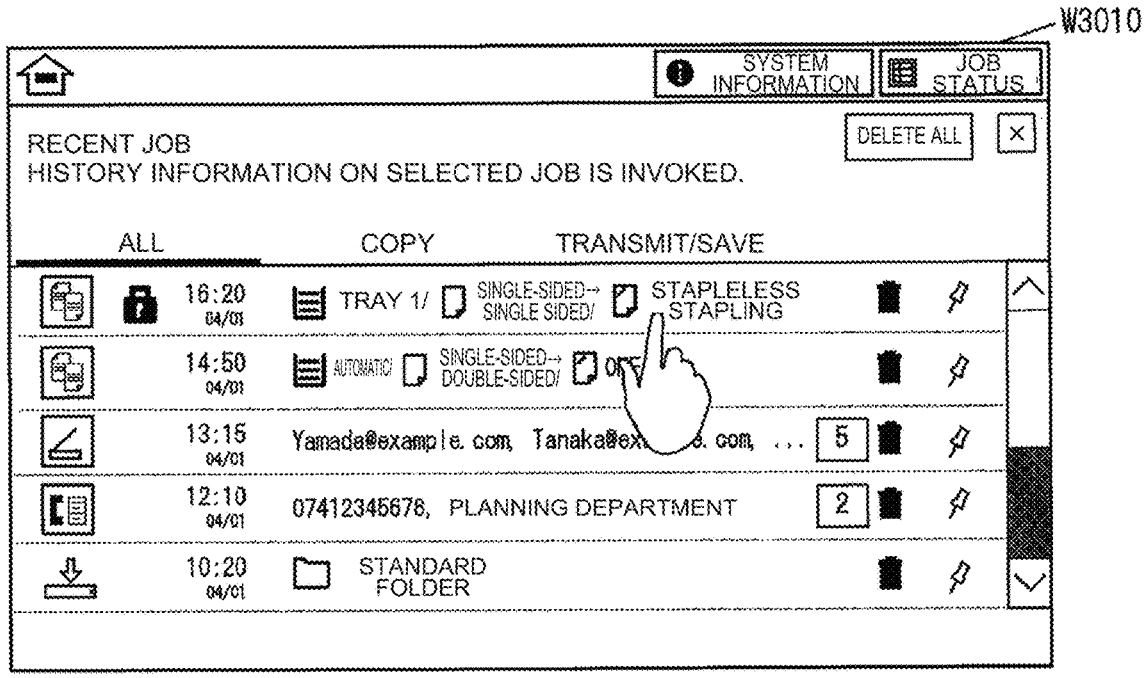
FIGS. 24A and 24B are diagrams illustrating an operation example according to the third embodiment.
Figure 24B:
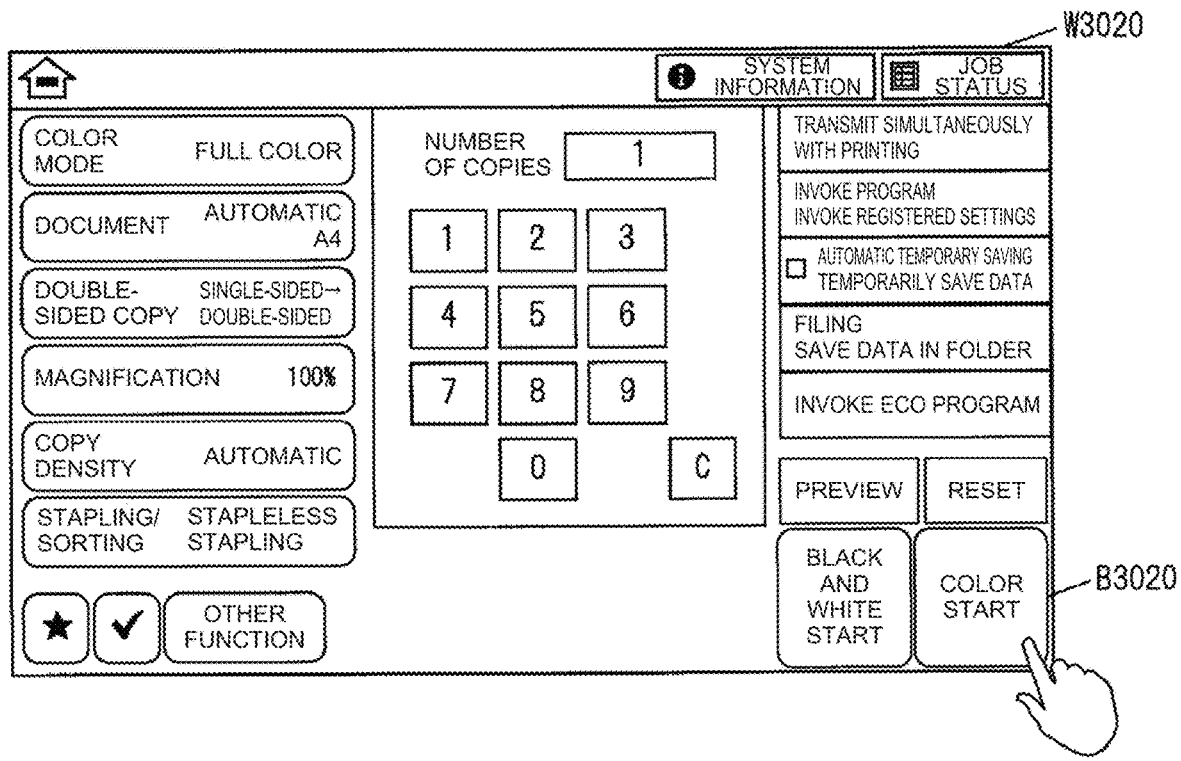

Next, a case is described in which setting history information on a job executed by the user A is selected in a state that the user A is authenticated with reference to FIGS. 24A and 24B. FIG. 24A is a diagram illustrating a screen example of a setting history information display screen W3010. The setting history information display screen W3010 displays setting history information on an authenticated user (user A), and setting history information on another user (user B) with whom the setting history information is shared. Herein, the user A selects setting history information on a job executed by the user A. Note that, selected setting history information is assumed to be setting history information on a job (confidential print job) of printing a protected file.

FIG. 24B is a diagram illustrating a screen example of a setting screen W3020 based on setting history information selected by the user A. The user A can execute a job of printing a protected file by performing an operation of selecting a "color start" button B3020.

Herein, the image processing apparatus 12 determines that input of authentication information is not required, since setting history information selected by the authenticated user A is a job executed by the user A. Therefore, even in a case where an operation of executing a job of printing a protected file is performed, authentication information is not requested.

Figure 25A:
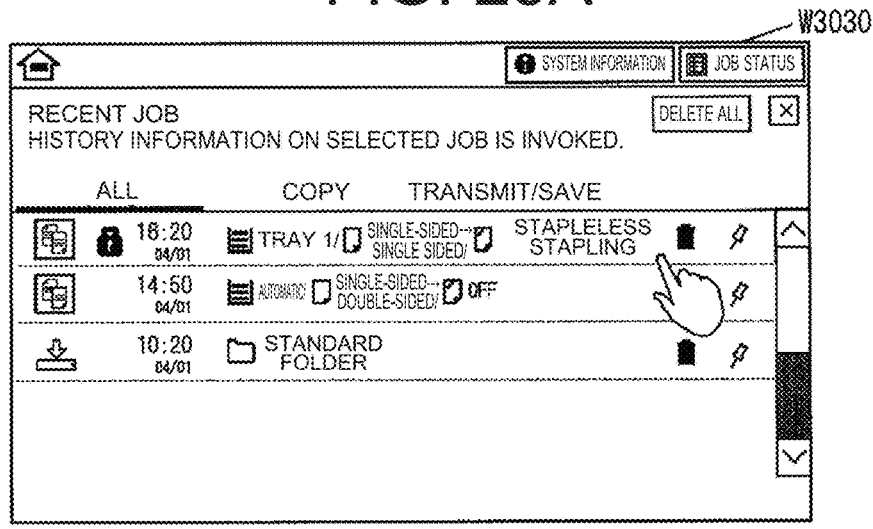
FIGS. 25A to 25C are diagrams illustrating an operation example according to the third embodiment.
Figure 25B:
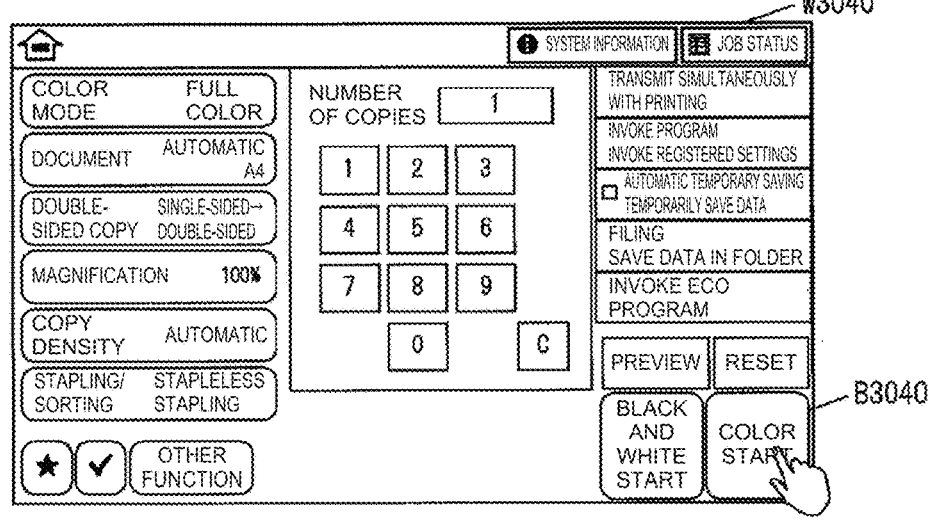
Figure 25C:
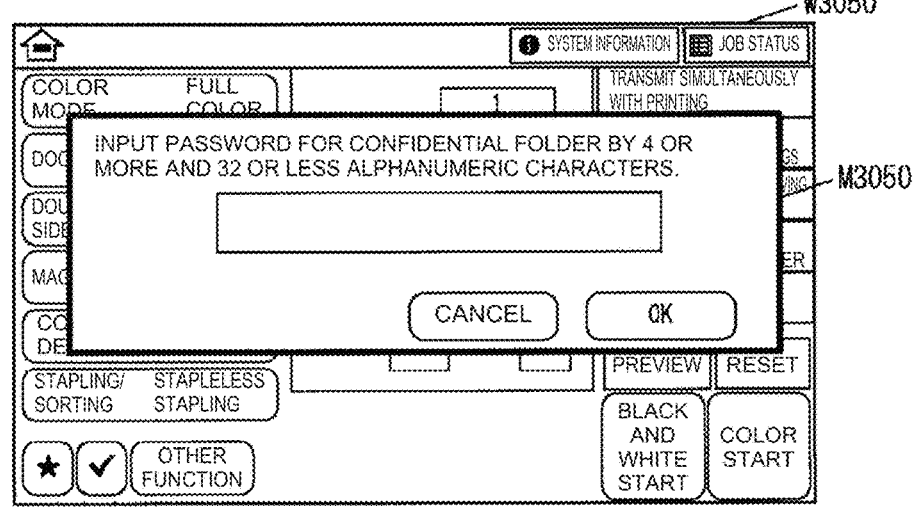

Next, a case is described in which setting history information on a job executed by the user A is selected in a state that the user B is authenticated with reference to FIGS. 25A to 25C. FIG. 25A is a diagram illustrating a screen example of a setting history information display screen W3030. The setting history information display screen W3030 displays setting history information on an authenticated user (user B), and setting history information on another user (user A) with whom the setting history information is shared. Herein, the user B selects setting history information on a job executed by the user A. Note that, selected setting history information is assumed to be setting history information on a job (confidential print job) of printing a protected file.

In this way, an authenticated user can execute a job of outputting a file stored in a registered folder of another user or by another user by selecting setting history information on a job executed by the another user other than the user. Likewise, an authenticated user can execute a job of storing a file in a registered folder of another user.

FIG. 25B is a diagram illustrating a screen example of a setting screen W3040 based on setting history information selected by the user B. The user B can allow the image processing apparatus to execute a job of printing a protected file by performing an operation of selecting a "color start" button B3040.

Herein, the image processing apparatus 12 determines that input of authentication information is required, since setting history information selected by the authenticated user B is a job executed by the user A, who is different from the user B. Consequently, authentication information is requested.

FIG. 25C is a diagram illustrating a screen example of a password input screen W3050 to be displayed when input of authentication information is requested. The password input screen W3050 displays a message dialog M3050 including an input field of authentication information. The user B can allow the image processing apparatus to execute a job of printing a protected file by inputting authentication information required for reading a protected file, and selecting the "color start" button again.

Note that, in the embodiment described above, it is assumed that a user can register a plurality of user folders, but it may be configured in such a way that one user folder is allocated to one user. Also, authentication of a user may be authentication of a group to which one or more users belong. Furthermore, an authentication means for authenticating a user may employ a method such as belongings authentication or biometric authentication, in addition to knowledge authentication.

Further, in the embodiment described above, determination as to whether authentication information is required is made according to determination as to whether an authenticated user and a user associated with selected setting history information match. However, determination as to whether authentication information is required may be made by another method. For example, even in a case where an authenticated user and a user associated with selected setting history information match, when a file stored in a confidential folder, which is not my folder is output, or a file is stored in a confidential folder, which is not my folder, it may be determined that input of authentication information is required.

In the image processing apparatus according to the present embodiment, authentication information is not requested, even when a user who has executed a job selects setting history information associated with the job, and the setting history information includes a setting value for which authentication information is required. Consequently, user convenience can be improved. On the other hand, when a user other than a user who executed a job selects setting history information associated with the job, and the setting history information includes a setting value for which authentication information is required, the authentication information is requested. This can secure confidentiality and secrecy of a file.

4. Fourth Embodiment

Next, a fourth embodiment is described. In addition to processing described in the third embodiment, the fourth embodiment is an embodiment in which authentication information is requested, in a case where a file is stored in a shared folder, and thereafter, the shared folder is changed into a confidential folder. The present embodiment is an embodiment in which FIG. 17 in the third embodiment is replaced with FIG. 26. Note that, a same functional unit is indicated with a same reference sign, and description thereof is omitted.

Figure 26:
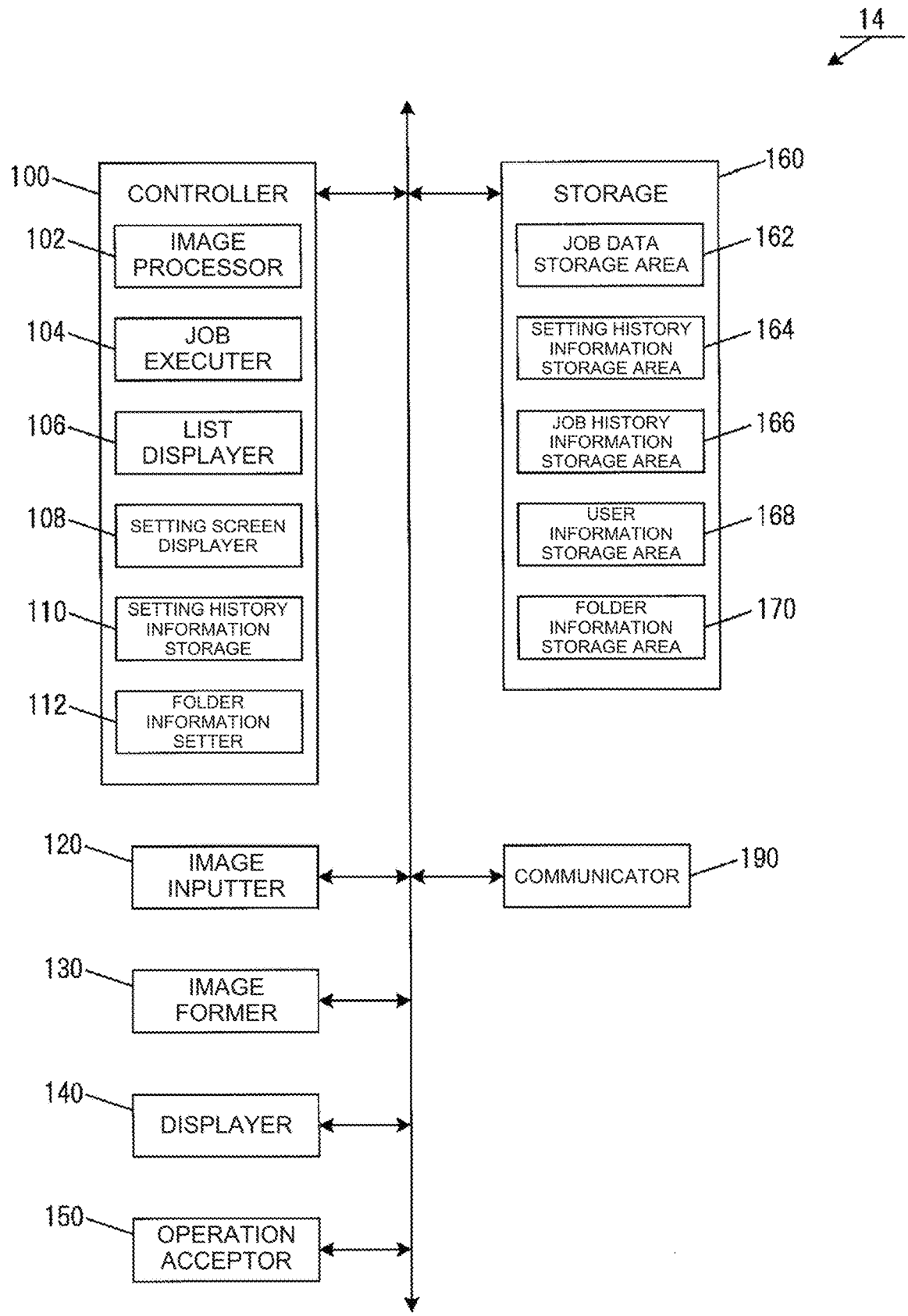
FIG. 26 is a diagram illustrating a functional configuration of an image processing apparatus according to a fourth embodiment.

A functional configuration of an image processing apparatus 14 according to the present embodiment is described with reference to FIG. 26. Unlike the image processing apparatus 12, in the image processing apparatus 14, a controller 100 further functions as a folder information setter 112. The folder information setter 112 performs folder information setting processing of setting folder information included in a filing area.

The folder information setter 12 performs the following processing, as folder information setting processing.

(1) The folder information setter 112 displays a user folder setting screen on which a user folder is displayed to be selectable.

(2) When a user folder selected by a user is a shared folder, and an operation of inputting a password is performed, the folder information setter 112 sets a confidential folder by setting the input password, as authentication information on the selected user folder. For example, the folder information setter 112 sets, as "confidential folder", a folder type of folder information associated with a selected folder, and stores a password input to a folder password.

(3) When a user folder selected by a user is a confidential folder, and an operation of deleting authentication information is performed, the folder information setter 112 sets a shared folder by releasing authentication information set for the selected user folder. For example, the folder information setter 112 sets, as a "shared folder", a folder type of folder information associated with a selected folder, and deletes information stored in a folder password.

Folder information setting processing is performed, for example, in response to an operation by the administrator of the image processing apparatus 14. This changes folder type settings of a user folder. Further, a user folder setting screen may be displayed on a displayer 140 of the image processing apparatus 14, or may be displayed on a display device whose display is controlled by a terminal device connected to the image processing apparatus 14.

Next, an operation example according to the present embodiment is described. First, an overview of an operation according to the present embodiment is described with reference to FIGS. 27A to 27D. Note that, in description on FIGS. 27A to 27D, a user authenticated by user authentication to be performed by the image processing apparatus 14 is assumed to be a user C.

Figure 27A:
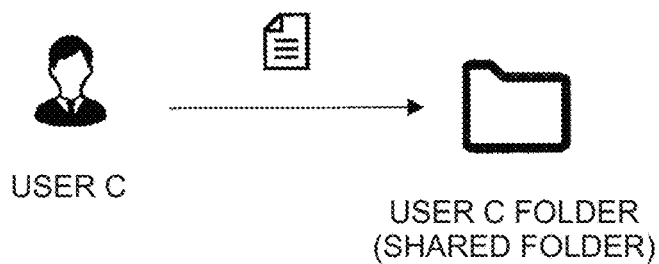
FIGS. 27A to 27D are diagrams illustrating an overview of an operation according to the fourth embodiment.
Figure 27B:
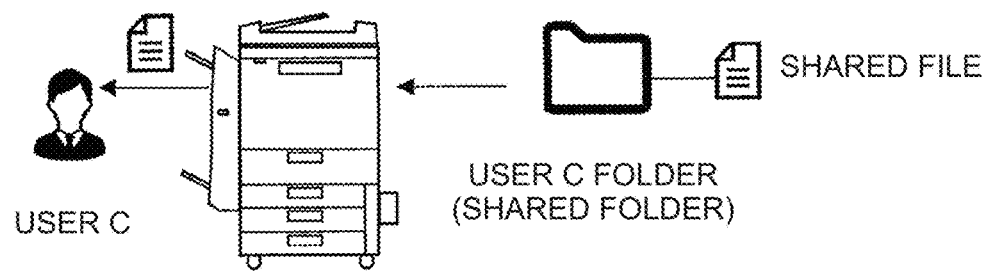

First, the user C stores a shared file in a user C folder, which is a user folder of the user C (FIG. 27A). Note that, the user C folder is assumed to be a shared folder. Next, user C executes a job of outputting an image based on a shared file (job data) stored in the user C folder (FIG. 27B). At this occasion, setting history information on a job of outputting a shared file stored in the user C folder is stored as setting history information on the user C.

Figure 27C:
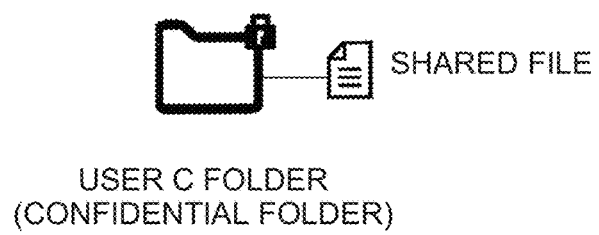

Next, the user C folder is changed into a confidential folder by performing folder information setting processing (FIG. 27C). Consequently, in a case where a shared file stored in the user C folder is read, authentication information for the user C folder is required.

Figure 27D:
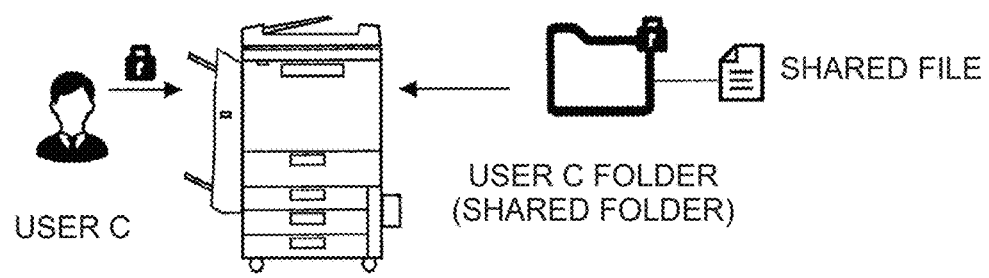

Subsequently, the user C selects setting history information on a job of outputting a shared file stored in the user C folder, and invokes a setting value. At this occasion, in a case where a shared file stored in the user C folder is read, since authentication information for the user C folder is required, the user C inputs the authentication information (FIG. 27D). This allows the user C to output an image based on a shared file stored in the user C folder.

In this way, in the present embodiment, settings of a folder in which a shared file is stored are changed after setting history information is stored, and before the setting history information is invoked. Therefore, invoking of the setting history information is restricted.

Figure 28A:
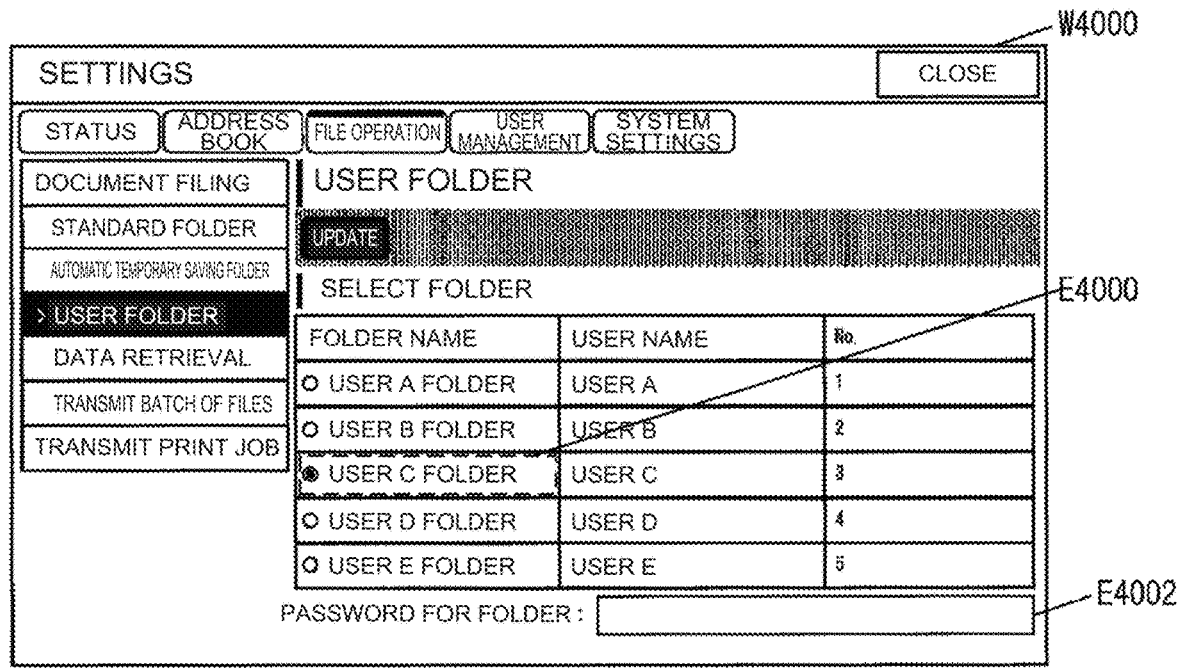
FIGS. 28A and 28B are diagrams illustrating an operation example according to the fourth embodiment.

Next, a screen example according to the present embodiment is described. FIG. 28A is a diagram illustrating a screen example of a user folder setting screen W4000. The user folder setting screen W4000 includes, for example, a list in which user folders are selectably listed, and an input field for inputting a folder password for a selected folder. The user selects, for example, "user C folder" E4000, as a user folder. At this occasion, an input field E4002 indicates a folder password for the user C folder. In FIG. 28A, the input field E4002 is blank. This indicates that a folder password, which is authentication information, is not set for the user C folder, and that the user C folder is a shared folder.

Figure 28B:
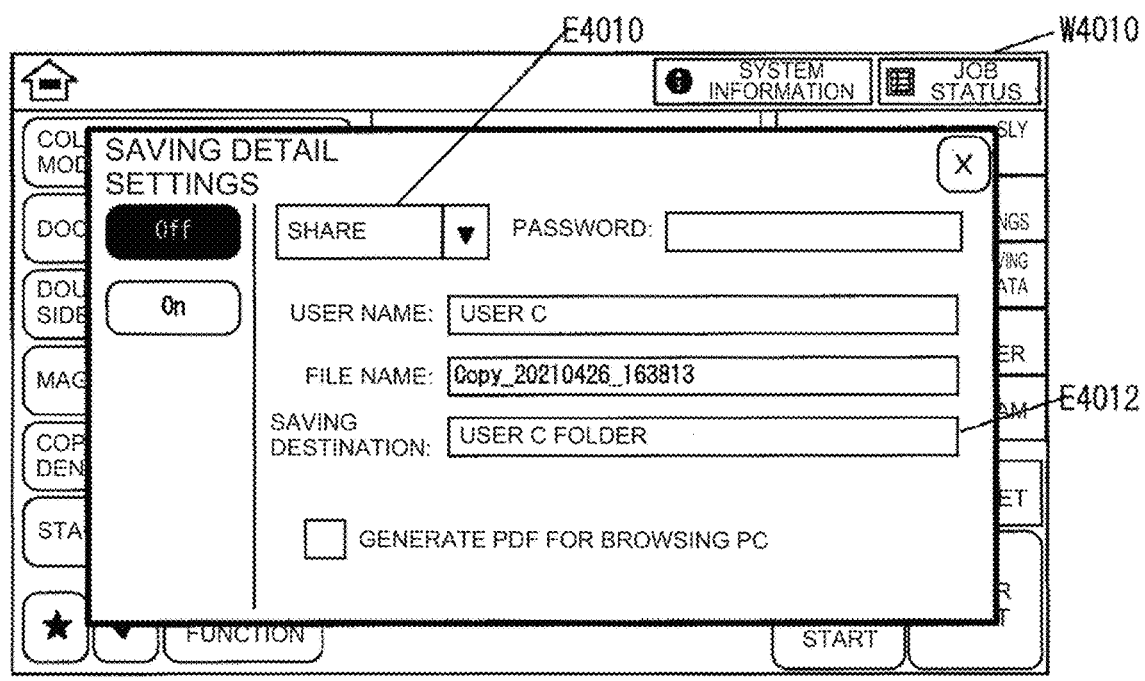

FIG. 28B is a diagram illustrating a screen example of a setting screen W4010 for storing a shared file in the user C folder, which is a shared folder. For example, the user C may select "shared", which is an attribute value indicating that setting is not confidential setting (e.g., E4010 in FIG. 28B), or select a user folder (e.g., "user C folder" in E4012 in FIG. 28B), as a storage destination of job data.

For example, the user C performs an operation of executing a scan and save job, and storing, in the user C folder, a file of scan data, as a shared file. Furthermore, by printing a shared file stored in the user C folder, the user C stores setting history information on a job of printing the shared file stored in the user C folder. Note that, since the setting history information includes, as a setting value, information on a shared file stored in a shared folder, input of authentication information is not required.

Figure 29A:
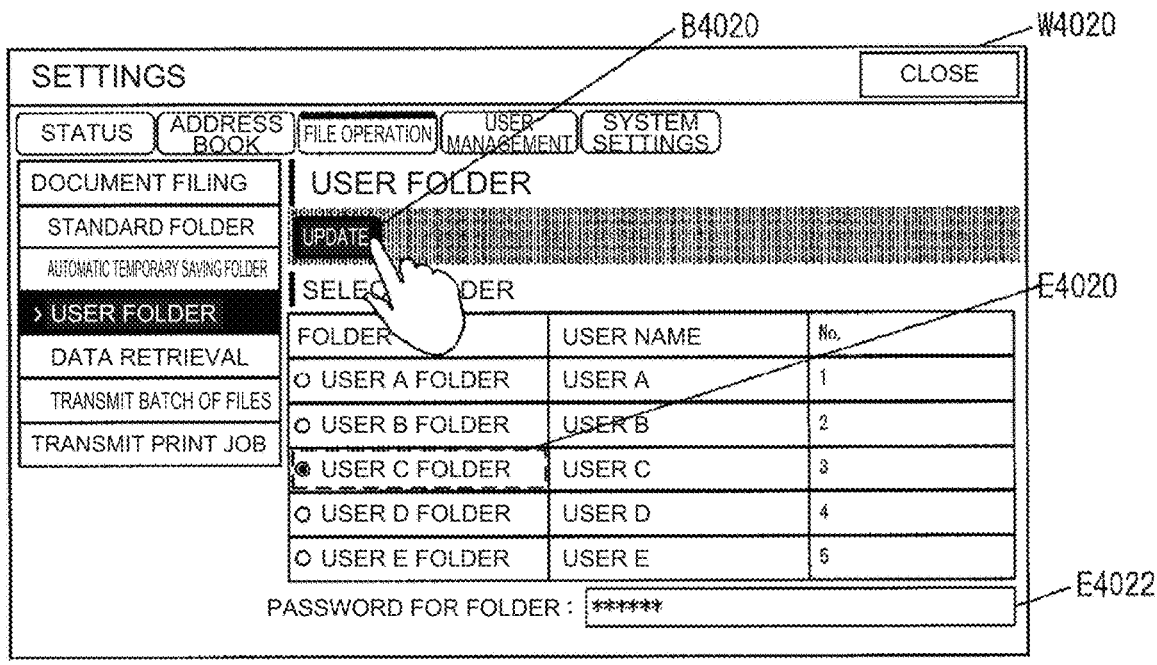
FIGS. 29A and 29B are diagrams illustrating an operation example according to the fourth embodiment.

FIG. 29A is a diagram illustrating a screen example of a user folder setting screen W4020. Herein, the user selects, as a user folder, for example, "user C folder" E4020, and inputs a folder password in an input field E4022 of authentication information. Further, the user selects an "update" button B4020. Thus, a folder password input to the input field E4022 is set for "user C folder". Consequently, "user C folder" is changed into a confidential folder.

Figure 29B:
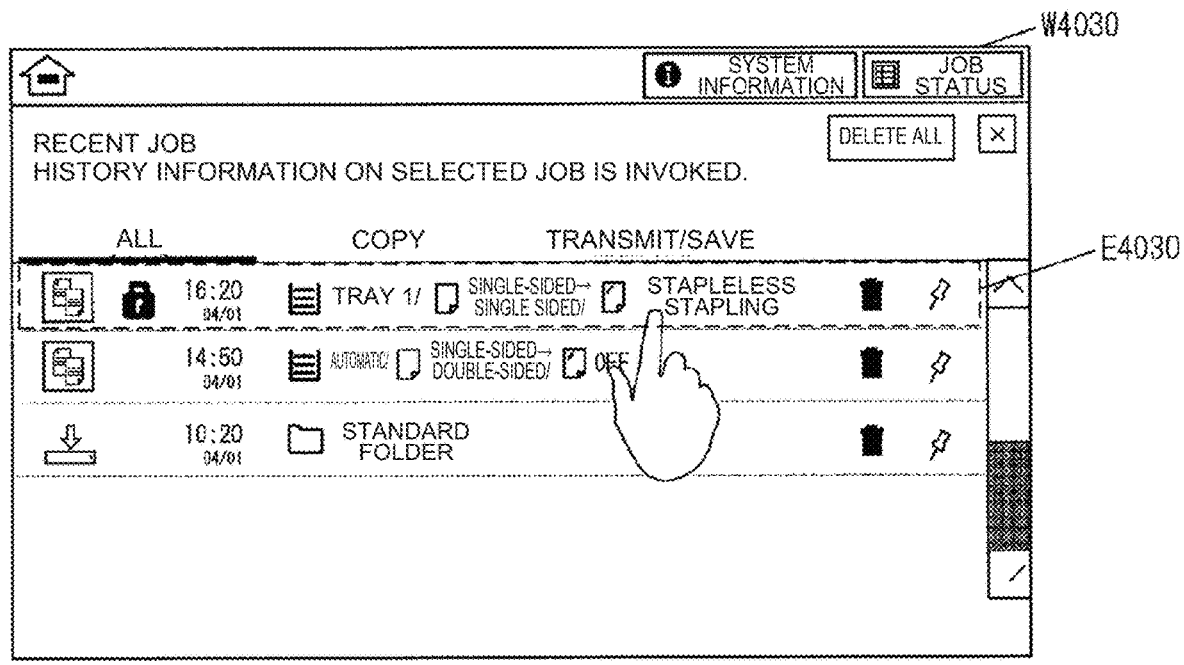

FIG. 29B is a diagram illustrating a screen example of a setting history information display screen W4030. Herein, the user C selects setting history information E4030 on a job of outputting a shared file stored in the user C folder. Herein, since the user C folder has been changed into a confidential folder, the setting history information E4030 is setting history information for which authentication information is required.

Figure 30A:
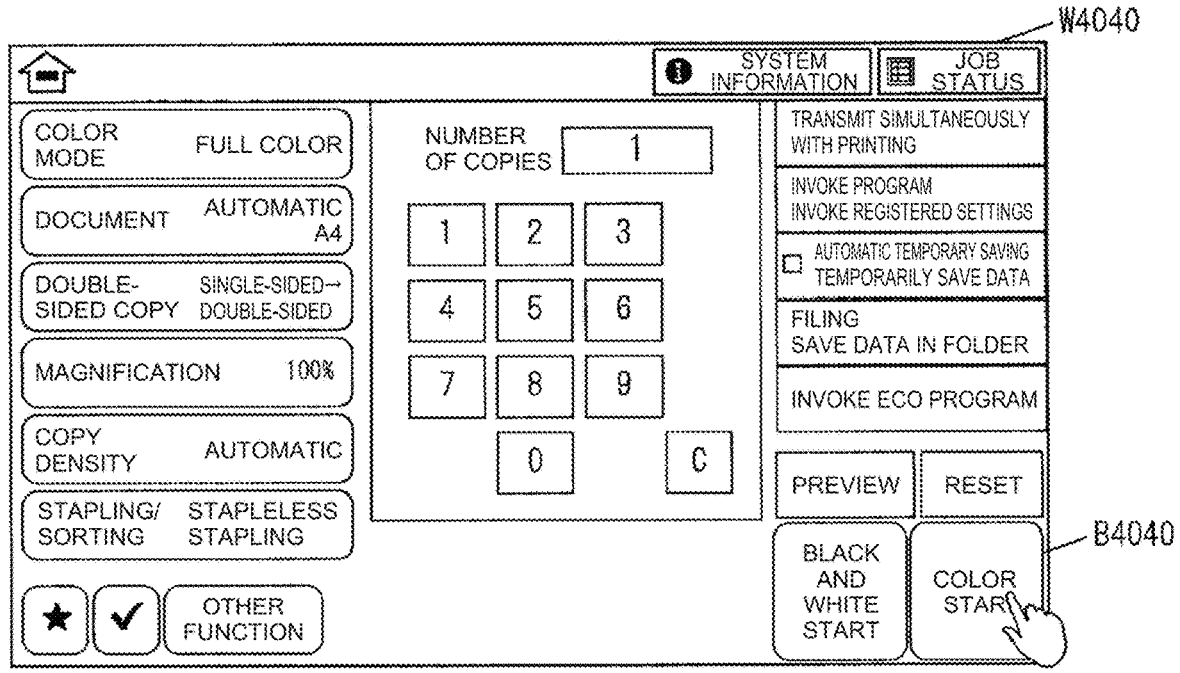
FIGS. 30A and 30B are diagrams illustrating an operation example according to the fourth embodiment.

FIG. 30A is a diagram illustrating a screen example of a setting screen W4040 to be displayed when the setting history information E4030 is selected by the user C. The setting screen W4040 is a basic screen for copying, and is a setting screen on which setting values included in the setting history information E4030 are expanded. Note that, input of authentication information is not requested at a time when a setting screen is displayed.

The user C can allow the image processing apparatus 14 to execute a job by selecting a "color start" button B4040 included in the setting screen W4040.

Figure 30B:
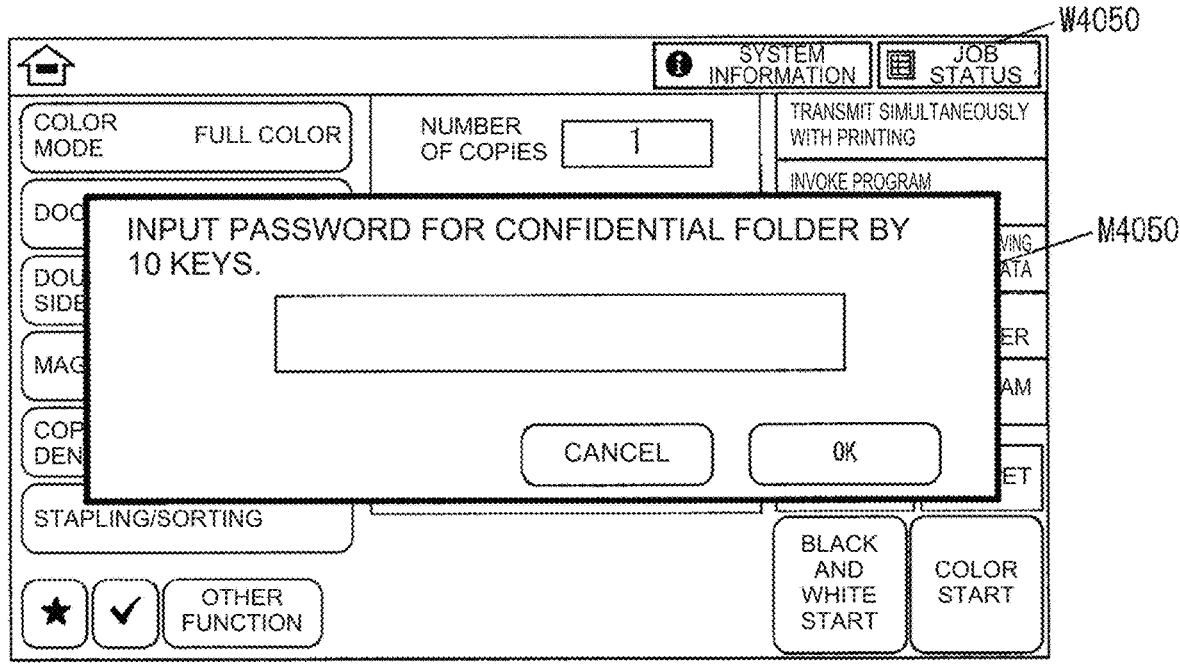

Herein, since a job to be executed is a confidential job, authentication information is requested. FIG. 30B is a screen example of a password input screen W4050 including a message dialog M4050 including an input field for inputting authentication information. Herein, since the user C folder has been changed into a confidential folder, the user C is required to input authentication information set for the user C folder.

In this way, a folder as a storage destination of a file associated with setting history information may be changed from a shared folder into a confidential folder during a period from a time when the setting history information is stored until the setting history information is invoked. Even in such a case, as described above in the operation example, input of authentication information set for a confidential folder is requested, and execution of a job associated with the history information is restricted.

Note that, in the operation example described above, a case is described in which a folder as a storage destination of job data is changed from a shared folder into a confidential folder. In a case where a folder is changed from a confidential folder into a shared folder, input of authentication information is not requested when a job is executed.

In the image processing apparatus according to the present embodiment, it is possible to appropriately determine whether authentication information is required, even in a case where settings of a storage destination of a file are changed after the file is stored.

5. Modifications

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

Although some of the above-described embodiments are described separately for convenience of explanation, it is needless to say that such embodiments may be combined and implemented within a technically allowable range.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) Disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. An image processing apparatus comprising:
   one or more memories that store one or more setting histories including setting values of a job that has been executed; and
   one or more controllers, wherein
   the one or more controllers display a list containing:
     the one or more setting histories for which authentication information is required when executing the job based on the setting values, and
     the one or more setting histories for which the authentication information is not required when executing the job based on the setting values, wherein:
   the one or more controllers further identifiably display the one or more setting histories for which the authentication information is required, and execute the job based on the setting values included in the one or more setting histories selected on the list,
   the one or more controllers further display an identification indication, which indicates that the authentication information is required for accessing the one or more setting histories for which the authentication information is required, side by side with the one or more setting histories for which the authentication information is required, and
   in a case that the one or more setting histories, for which the authentication information is required, are selected, the one or more controllers further display a job setting screen based on the selected one or more setting histories without requiring the authentication information.

2. The image processing apparatus according to claim 1, wherein the identification indication is an icon.

3. The image processing apparatus according to claim 1, wherein the one or more controllers require the authentication information at any time during a period from when the one or more setting histories for which the authentication information is required are selected on the list until the job, based on the setting values included in the one or more setting histories for which the authentication information is required, is executed.

4. The image processing apparatus according to claim 1, wherein the one or more setting histories for which the authentication information is required include setting values pertaining to a storage destination of a scan file.

5. The image processing apparatus according to claim 4, wherein the authentication information is authentication information set to the storage destination of the scan file.

6. The image processing apparatus according to claim 1, wherein the one or more controllers further
   perform user authentication,
   store the one or more setting histories of the job executed based on instructions received from an authenticated user in the one or more memories in association with information of the authenticated user, and
   forgo requiring the authentication information in a case that the one or more setting histories selected by the authenticated user on the list are the one or more setting histories of the job executed based on the instructions received from the authenticated user.

7. The image processing apparatus according to claim 1, wherein the one or more controllers require the authentication information after displaying the job setting screen.

8. An execution method of a job, comprising:
   storing one or more setting histories including setting values of a job that has been executed;
   displaying a list containing:
     the one or more setting histories for which authentication information is required when executing the job based on the setting values, and
     the one or more setting histories for which the authentication information is not required when executing the job based on the setting values;
   identifiably displaying the one or more setting histories for which the authentication information is required;
   executing the job based on the setting values included in the one or more setting histories selected on the list;
   displaying an identification indication, which indicates that the authentication information is required for accessing the one or more setting histories for which the authentication information is required, side by side with the one or more setting histories for which the authentication information is required; and
   in a case that the one or more setting histories, for which the authentication information is required, are selected, displaying a job setting screen based on the selected one or more setting histories without requiring the authentication information.

9. The image processing apparatus according to claim 7, wherein the one or more controllers require the authentication information after accepting an input of a job execution instruction via the job setting screen.

* * * * *